United States Patent [19]
Billyard et al.

[11] Patent Number: 5,579,454
[45] Date of Patent: Nov. 26, 1996

[54] THREE DIMENSIONAL GRAPHICS PROCESSING WITH PRE-SORTING OF SURFACE PORTIONS

[75] Inventors: Adam Billyard, London; Paul Otto; David Lau-Kee, both of Guildford, all of England

[73] Assignee: Canon Kabushiki Kaisha, Tokyo, Japan

[21] Appl. No.: 937,701

[22] Filed: Sep. 1, 1992

[30] Foreign Application Priority Data

Sep. 6, 1991 [GB] United Kingdom .................. 9119141

[51] Int. Cl.$^6$ ...................................................... G06T 15/40
[52] U.S. Cl. ............................................................ 395/121
[58] Field of Search ........................................ 395/121, 122

[56] References Cited

U.S. PATENT DOCUMENTS

| | | | |
|---|---|---|---|
| 4,924,414 | 5/1990 | Ueda .................................. | 395/121 X |
| 4,985,854 | 1/1991 | Wittenburg ........................... | 395/121 |
| 5,280,568 | 1/1994 | Obata .................................. | 395/121 |

FOREIGN PATENT DOCUMENTS

| | | |
|---|---|---|
| 0152741 | 8/1985 | European Pat. Off. . |
| 251800 | 1/1988 | European Pat. Off. . |
| 0422541A2 | 4/1991 | European Pat. Off. . |
| 2406927 | 5/1979 | France . |
| 2008368 | 5/1979 | United Kingdom . |
| 2181929 | 4/1987 | United Kingdom . |
| 2187615 | 9/1987 | United Kingdom . |
| 2201568 | 9/1988 | United Kingdom . |

OTHER PUBLICATIONS

Clark, "Hierarchical Geometric Models for Visible Surface Algorithms", Comm. of the Assn. for Computing Machinery, vol. 19, No. 10 (Oct. 1976).

Fuchs et al., "Near Real–Time Shaded Display of Rigid Objects", *Computer Graphics*, vol. 17, No. 3 (Jul. 1983), pp. 65–72.

Foley et al., "Computer Graphics Principles and Practice" Addison–Wesley Publishing Company, 1990, pp. 663–664 and 672–680.

Artificial Horizons Inc. "Aviator" documentation, 1991 (one page).

"Visibility Ordering Meshed Polyhedra" by Peter Williams (University of Illinois) in ACM Transactions on Graphics, vol. 11, No. 2, Apr. 2, 1992, pp. 103–126.

"Study for applying computer–generated images to visual simulation" by Schumacker et al., AFHRL–TR–69–74, US Air Force Human Resources Lab, Washington, D.C., Sep. 1969.

"A characterization of Ten Hidden–Surface Algorithms" by Sutherland, vol. 6, No. 1, Mar. 1974, pp. 1–55.

*Primary Examiner*—Mark K. Zimmerman
*Attorney, Agent, or Firm*—Fitzpatrick, Cella, Harper & Scinto

[57] ABSTRACT

To effect hidden surface removal, polygons making up a three dimensional object are initially ordered using a Topological Sort into, for example, three rendering order lists corresponding to orthogonal axis. When the object is to be represented from a given view direction, the view direction is compared to the axis and the rendering list corresponding to the closest match is selected. Polygons are then rendered in list order, backward facing polygons being omitted. Performing the ordering at the polygon level, in an initial step, saves computation and consequently enables the projection and rendering processes to be speeded up to provide real time interactive three dimensional graphics. The Topological Sorting process is particularly computationally effective.

18 Claims, 20 Drawing Sheets

| | | | | | | | | | | | |
|---|---|---|---|---|---|---|---|---|---|---|---|
| P1 | 2 | 3 | 4 | 5 | 6 | 7 | 8 | 9 | 10 | 11 | 12 |
| P2 | 1 | 3 | 4 | 5 |   | 7 | 8 | 9 | 10 | 11 | 12 |
| P3 | 1 | 2 |   | 12 |   |   |   |   |   |   |   |
| P4 | 8 | 9 | 10 | 11 | 12 |   |   |   |   |   |   |
| P5 | 6 | 7 | 8 |   |   |   |   |   |   |   |   |
| P6 | 1 |   | 3 | 4 | 5 | 7 | 8 | 9 | 10 | 11 | 12 |
| P7 | 1 | 2 | 3 | 4 | 5 | 6 | 8 | 9 | 10 | 11 | 12 |
| P8 | 1 | 2 | 3 | 4 | 5 | 6 | 7 | 9 | 10 | 11 |   |
| P9 |   | 6 | 7 | 8 |   |   |   |   |   |   |   |
| P10 | 2 | 3 | 4 | 5 | 6 |   |   |   |   |   |   |
| P11 | 1 | 2 |   | 12 |   |   |   |   |   |   |   |
| P12 | 1 | 2 | 3 | 4 | 5 | 6 | 7 |   | 9 | 10 | 11 |

| | | | | | | | | | | | |
|---|---|---|---|---|---|---|---|---|---|---|---|
| P1 | 4 | 5 | 9 | 10 | | | | | | | |
| P2 | 4 | 5 | 9 | | | | | | | | |
| P3 | | | | | | | | | | | |
| P4 | 9 | 11 | | | | | | | | | |
| P5 | | | | | | | | | | | |
| P6 | 3 | 4 | 11 | | | | | | | | |
| P7 | 3 | 4 | 10 | 11 | | | | | | | |
| P8 | 3 | 10 | 11 | | | | | | | | |
| P9 | | | | | | | | | | | |
| P10 | 3 | 5 | | | | | | | | | |
| P11 | | | | | | | | | | | |
| P12 | 5 | 9 | 10 | | | | | | | | |

213

THREE DIMENSIONAL GRAPHICS PROCESSING WITH PRE-SORTING OF SURFACE PORTIONS

BACKGROUND OF THE INVENTION

1. Field of the Invention

This invention relates to apparatus for generating two dimensional representations of three dimensional objects, particularly for generating animated displays corresponding to object motion in three dimensions, and to methods of generating such images.

2. Description of the Related Arts

Three dimensional graphics processing apparatus is used in a number of applications; for instance, in generating displays of the appearance of an object from several angles during computer aided design and computer aided manufacture, or in electronic video arcade games, or in flight simulators for training. Other applications include visualising mathematical surfaces, or plotting data of any kind.

To provide animation, it is necessary to update the image at rates approaching 25 or 30 frames per second, so that a human eye sees a continuous change rather than a series of static images (although lower speeds, for example 10 frames per second, may be acceptable in some applications). The speed at which the processing apparatus can perform calculations, coupled with the minimum acceptable frame rate, provides a limit to the number of calculations which can be performed to generate each image. In three dimensional graphics, it is necessary in each image to calculate the projection of the three dimensional objects concerned into two dimensions, and depending upon the complexity of the object, this can involve a considerable number of calculations.

In some applications, a relatively low resolution model of a three dimensional object is acceptable. For example, in computer aided design (CAD), data defining a three dimensional object is retained by the processor as coordinates of a plurality of points on the object surface which are displayed as a "wire frame" image. When the object is to be displayed as moving in three dimensions, the processor calculates, at the necessary frame repetition rate, the projection of the points into two dimensions and draws a display in which the points are connected on a screen; the relatively small number of points in the wire frame model makes this possible. Since real time calculation of the two dimensional projections is thus possible, the processor can provide input means and control means enabling a human operator to directly manipulate the movement of the viewpoint relative to the object, for example to see it from a different angle.

On the other hand, animated sequences showing the movement of three dimensional objects which are used in films, for example, are required to exhibit much finer resolution, not only spatially but also in grey scale and colour. Providing animated representations which are indistinguishable from photographs ("photorealism") is an object of much present research, but at present, although such quality is attainable, it cannot be achieved in real time and consequently cannot provide for interactive manipulation by an operator. Instead, images are calculated one by one, stored, and then displayed.

Currently, image synthesis is often performed by synthesising an image as a number of polygons defined by corner points, and then processing each polygon in turn to define, for each pixel of the polygon, the pixel colour in accordance with predetermined colour and transparency parameters associated with the polygon. The process of creating and colouring pixels of the polygon is generally referred to as "rendering". Whereas the operations of defining the positions of the corners of the polygon require relatively complex mathematical operations on a relatively small number of points, the task of rendering involves relatively simple multiplications and additions repetitively performed on a very large number of pixels. Accordingly, dedicated image processing apparatus is known which accepts data defining the corners of the polygon and rendering parameters, and writes corresponding pixel data into an image buffer for display. However, such apparatus is at present expensive.

A particular problem which occurs with three dimensional graphics is that of hidden line or hidden surface removal. It is desired, when displaying solid objects, that nearer parts of the object obscure further parts. A common approach is to test, when a given pixel is rendered, whether it lies in front (and therefore occludes) or behind, (and therefore is occluded by) the pixel (if any) which is already within the image buffer. Accordingly, each pixel needs to be assigned a depth value. This technique is referred to as the "z-buffer algorithm". Although it is simple, it necessarily involves a large number of comparison operations (on the order of the number of pixels in the image buffer), and thus requires very fast image processing hardware for real time operation.

An alternative technique is to perform the decision as to whether a part of the image occludes, or is occluded by another, at the polygon level prior to rendering. Accordingly, in this technique, the processor considers polygons and decides which lies in front of the other in the view which is to be drawn. The number of decisions to be made is reduced from one per pixel to one per polygon, but the computation complexity of each decision is considerably increased, which slows the process.

The "Painter's Algorithm" for Hidden Surface Removal examines the coordinates of the vertices of the polygons, and ranks the polygons into order of decreasing distance from the display plane (viewpoint). The polygons are then rendered in order of distance, so that the pixels of the most distant polygons are first written into the image buffer, and are overwritten as necessary by those of nearer polygons. However, this technique requires the sorting operation of all polygons to be performed for each new image to be displayed (or, at least, each time the image changes) and consequently requires a large amount of computation in real time.

In a known technique, polygons are viewed as having two faces; one face directed inwardly towards the interior of the object (the "behind" face) and one face directed outwardly of the object (the "front" face). For a solid object, the "behind" face of a polygon is never visible; only polygons which face forwards therefore need to be displayed. Accordingly, a decision is made prior to rendering whether, from the viewing angle concerned, a given polygon is showing its front (outer) or behind (inner) face, and only those polygons which are facing forward are rendered. This reduces the problem of hidden surface removal, but does not eliminate the problem altogether.

A further known technique is known as "binary partitioning" (BSP), described in "On visible surface generation by a priori tree structures" Kedem et al, Computer Graphics Vol 14, No. 3 (1980) pp 124–133 and "Near real time shaded display of rigid objects", Abram et al, Computer Graphics Vol 17, No. 3 (1983) pp 65–72. In this technique, prior to animation, a preprocessing stage is performed in which a tree structured model is built in memory, each node in the tree being a polygon and pointing to successor and predecessor nodes (if any).

The function of the tree is that all successor (for example) nodes to a polygon will be polygons which, from the first polygon's point of view, lie wholly in front of that polygon and all predecessor (say) nodes are likewise wholly behind that polygon. To construct such a tree it is thus necessary that no polygon should cross the plane of any other, or otherwise there would be an indeterminacy as to whether it lay in front or behind that polygon. Each polygon may therefore be thought of as dividing space into two; a space in front of the plane and a space behind the plane, hence the name of the technique.

When it is desired to draw the object, the root polygon is initially selected. To determine which way through the tree to progress, the plane equation of the polygon $Ax+By+Cz+D$ is solved using the coordinates of the viewing position from which the three dimensional object is to be drawn; the sign of the result determines whether the viewing position lies in front or behind the polygon (ie whether the polygon is facing towards or away from the viewing position). In dependence upon this sign, it is determined whether it is the successor nodes or the predecessor nodes of the tree which are to correspond to polygons lying behind others; in other words, the direction in which the tree is to be traversed.

A next polygon lying behind the root polygon is then selected, and the above process is repeated. When a polygon having none behind it is reached, that polygon is drawn, and the next forward polygon is again selected. If that polygon now has none behind it, it is drawn; otherwise the next polygon behind it is selected. Thus, every polygon behind a given polygon is drawn before that polygon, and then it is drawn.

However, in many cases polygons do not lie wholly behind others; such polygons are therefore split in two parts, one lying in front and one behind. This leads to a substantial increase in the number of polygons. Further, the performance of the technique depends upon the polygon chosen as the root of the tree while it is constructed and appropriate selection criteria are not known. Further, a plane equation must be solved for each polygon during traversal of the tree, for each frame to be displayed, which is computationally expensive and slow.

SUMMARY OF THE INVENTION

According to one aspect of the present invention, there is therefore provided an image processor for generating moving 3-D graphics images, comprising means storing data defining a plurality of surfaces of an object; means for defining and storing at least one surface order list, and ranking said surfaces in order of distance along a corresponding direction, and means for generating image areas corresponding to said surfaces, said image areas being generated in the order of the corresponding surfaces in said order so as to effect hidden surface removal. Although for some objects a single list may suffice, in other cases two or three or exceptionally, more lists may be needed. The processor in this case further comprises means for selecting a said order in dependence upon the similarity between a view direction and a corresponding said direction.

The directions may comprise orthogonal axes. Preferably, the means for defining the order does so using a topological sort.

According to another aspect of the present invention, there is provided an image processor comprising means for drawing a plurality of surfaces defining a representation of a three dimensional objection and means for sorting said surfaces into an order for drawing so as to perform hidden surface removal, in which the means for sorting is arranged to sort taking account of the topological relationship between the surfaces, and preferably by performing a so called Topological Sort. We have found that this is surprisingly more effective than a sort based purely on the relative distances of the surfaces along the viewing direction according to which the surfaces are drawn.

Viewed in another aspect, the invention comprises a method of, and apparatus for, ordering surfaces into a list for subsequent use in specifying the order in which they are rendered, in which an initial determination is made as to which polygons occlude which others, and which occlude no others. By performing this discrimination, it is possible to reduce the amount of sorting subsequently necessary; other sorting methods based, for example, upon the spatial displacement of polygons along a direction take no account of the fact that some cannot occlude others since at positions where they would otherwise do so, those which they would otherwise occlude are backward facing and consequently not rendered anyway.

Because the process of traversing the list(s) is quick, animation speed is increased. Additionally, because the process of creating the list(s) is quick, the object may be edited without excessive delay whilst the list is re-evaluated, making real-time editing possible.

Other features and advantages of the present invention will be apparent from the following description taken in conjunction with the accompanying drawings, in which like reference characters designate the same or similar parts throughout the figures thereof.

Other aspects and preferred embodiments of the invention are as described or claimed hereafter.

BRIEF DESCRIPTION OF THE DRAWINGS

The invention will now be illustrated, by way of example only, with reference to the accompanying drawings, in which:

FIG. 16 shows the corresponding table following the execution of the process of FIG. 12;

DESCRIPTION OF THE PREFERRED EMBODIMENTS

General Description of Apparatus

Figure 1:
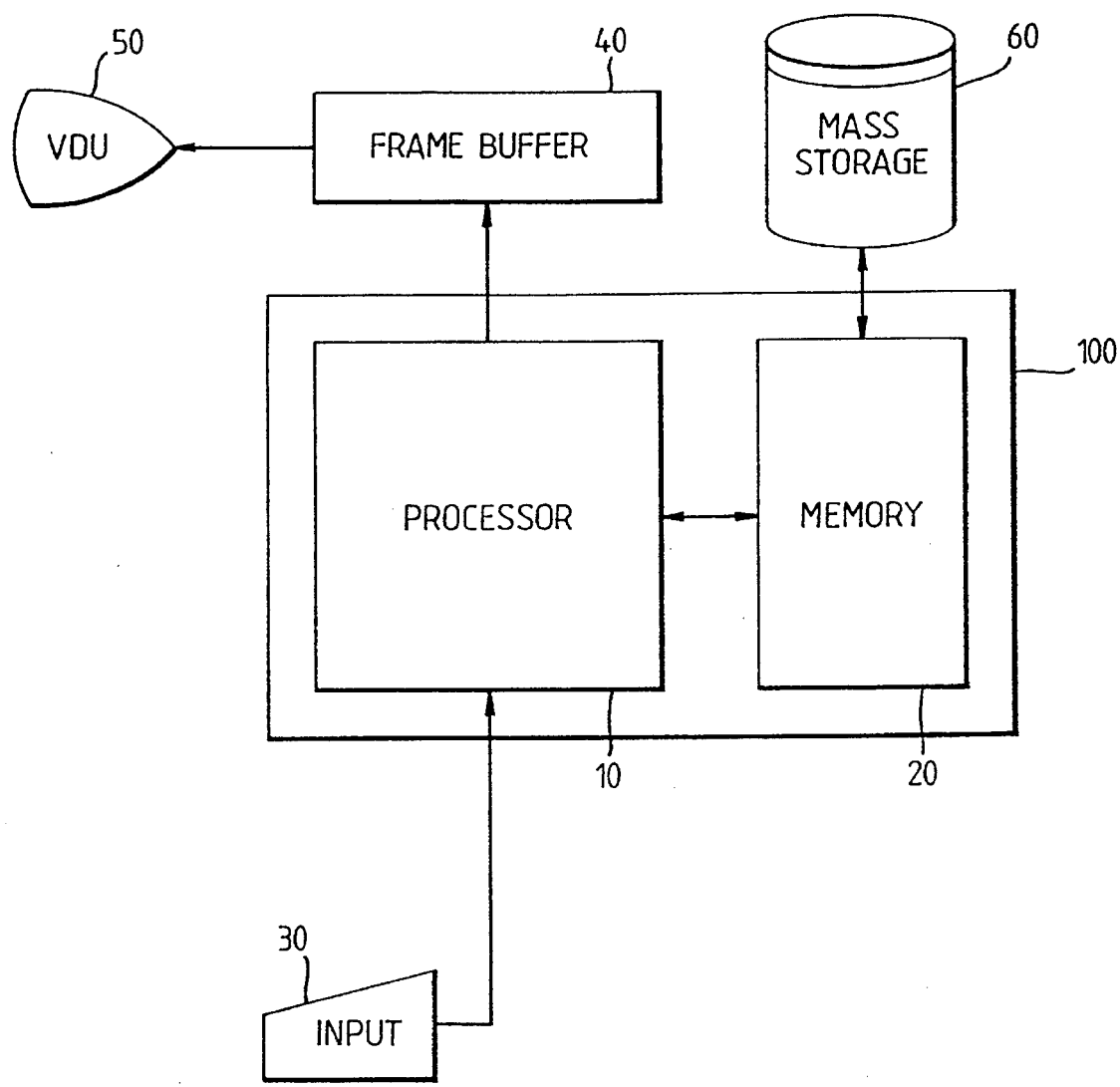
FIG. 1 is a block diagram showing schematically apparatus according to one embodiment of the invention.

FIG. 1 is a block diagram showing the general arrangement of apparatus according to one embodiment of the invention. The apparatus comprises a processor 10 (for example a microprocessor) coupled to a memory 20 operable to store a program defining the sequence of operations of the processor 10, and to store object and image data used and calculated by the processor 10. Coupled to an input port of the processor 10 is an input device 30, which may typically comprise a keyboard but may also, or alternatively, comprise a position sensitive input device such as a "mouse" tracker ball, digitizer tablet and stylus and so on. Also coupled to the processor 10 is a frame buffer 40 comprising a memory unit arranged to store image data relating to at least one image, usually by providing one (or several) memory location(s) per point or picture element (pixel) of the image. The address within the frame buffer 40 of the data relating to each pixel is related to the position within the image of that pixel (in other words the frame buffer 40 is memory mapped). Images are generally two dimensional arrays of image elements, and are conventionally described in terms of Cartesian coordinates, so that the position of a given pixel can be described by a pair of X, Y coordinates; this is convenient when, for example, the image is to be displayed upon a raster scan display units since the X and Y coordinates map to the distance along a line and the number of line, respectively. The number of picture elements in an image dictates the resolution of the image. Thus, for an image having a resolution of (for example) 1,000 times 1,000 pixels (i.e., N, M=1,000) the frame buffer 40 is required to include $10^6$ pixel locations; the address of a given pixel location corresponding to a pixel having coordinates X, Y will be given by X+M*Y where M is the total number of pixels in a line.

Coupled to the frame buffer 40 is a display unit 50, arranged in conventional fashion to be driven by a signal corresponding to the image stored in the frame buffer 40 at a normal frame repetition rate of 5–50 frames per second (typically 25 or 30). Coupled to the memory 20 (typically via the processor 10) and possibly also to the frame buffer 40, is a mass storage device 60 such as a hard disc drive, having a high capacity for data so as to be capable of storing several images or image or object data to be loaded into the memory 20.

The processor 10 and memory 20, and optionally also the frame buffer 40, display unit 50 and mass storage device 60, may be provided as a single computer unit; for example, a work station unit such as the Sparc Station available from Sun Microsystems; this unit for example includes a processor 10 based on RISC (reduced instruction set computer) architecture which is sufficiently fast to avoid, in some embodiments of the invention, the need to use a separate rendering processor or graphics engine to generate the image data in the frame buffer 40.

General Description of Operation

Figure 2:
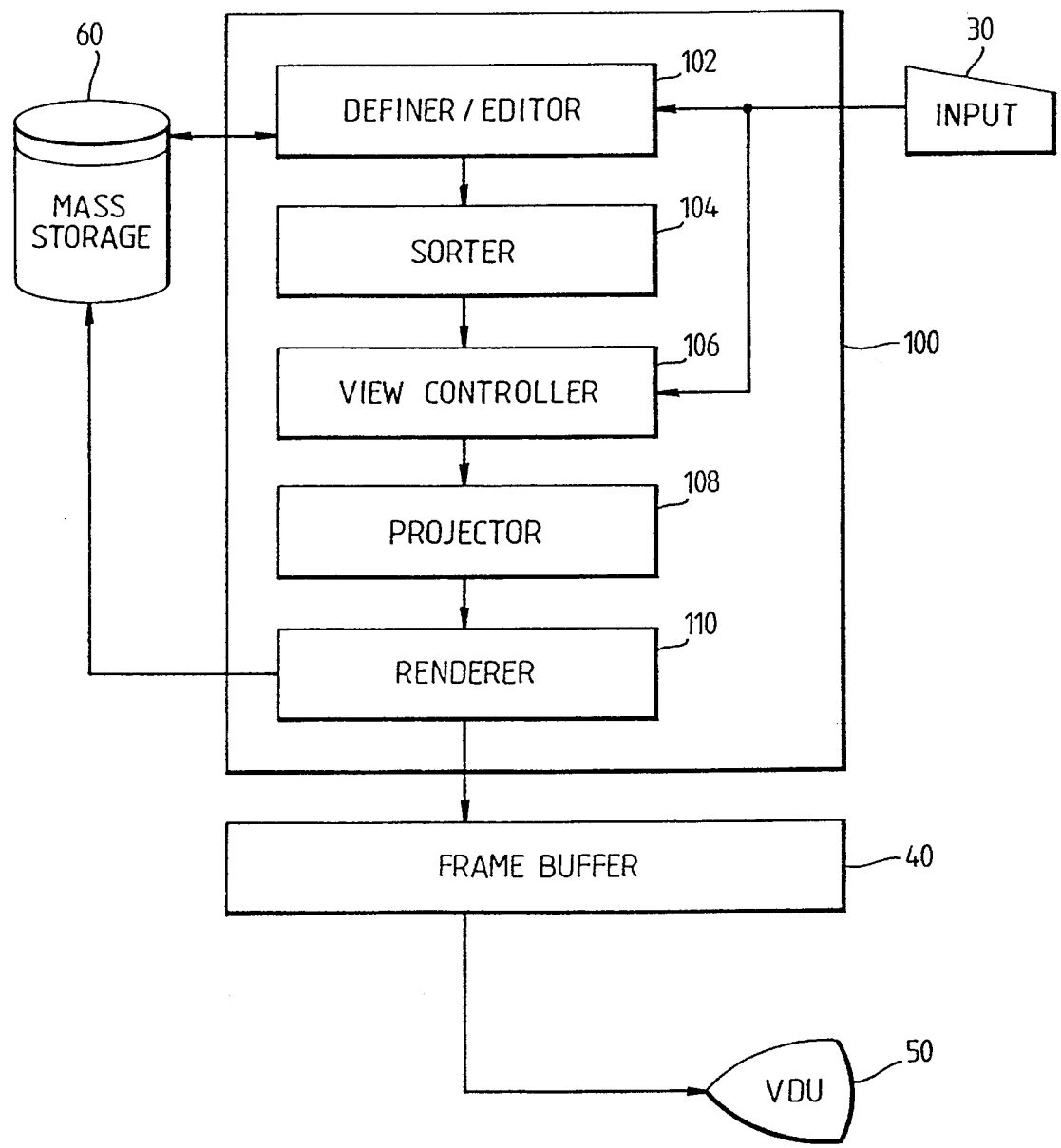
FIG. 2 is a block diagram showing illustratively the functional elements performed by the processor of the apparatus of FIG. 1.
Figure 3A:
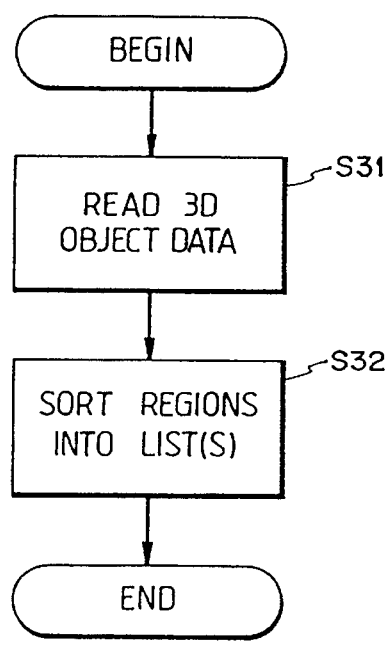
FIGS. 3a and 3b are flow diagrams showing schematically the general flow of operations of this embodiment of the invention.
Figure 3B:
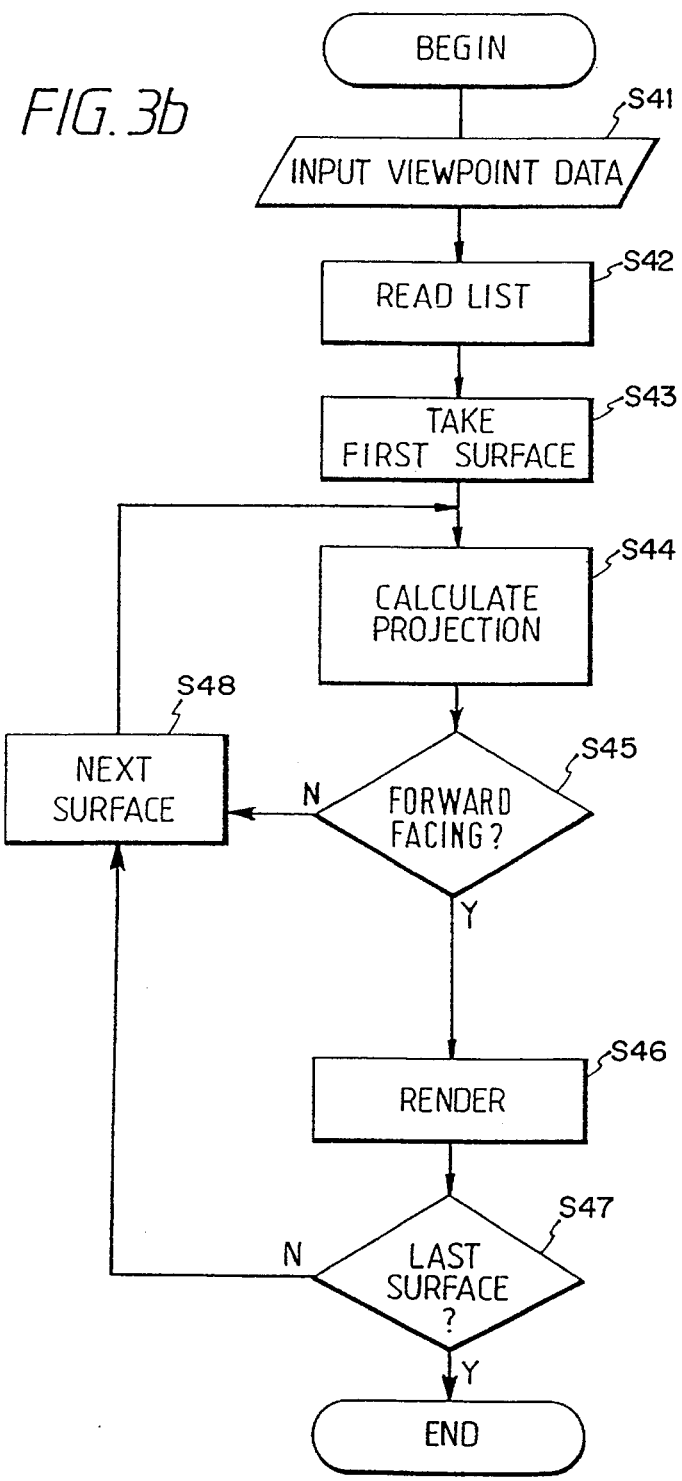

Referring to FIGS. 2, 3a and 3b, the general method of operation of this embodiment will now be described. The computer 100 performs a number of different operations at different times, executing corresponding stored programs within the memory 20, and therefore comprises (together with the memory 20) means 102–110 for performing such operations; these means are illustratively shown in FIG. 2 as separate although in the described embodiment all are performed by the processor 10 in cooperation with the memory 20. It will of course be understood, however, that separate processors or dedicated logic circuits, operatively interconnected, could be provided to execute each function.

The embodiment may thus be viewed as comprising, firstly, a definer or editor 102 arranged to define the shape of a three dimensional object to be animated and likewise, optionally, to edit the object; typically, the definer 102 is connected to the mass storage device 60 to enable an object, once defined, to be stored for subsequent use, and the editor 102 is connected to the input device 30 to enable an operator to alter the three dimensional object. However other input and output devices (for example, other computers connected via a network) may be provided in addition to, or instead of the input device 30 and mass storage device 60. As will be described in greater detail below, in this embodiment the data defining a three dimensional object is data representing corner points or vertices of a plurality of polygonal surfaces (typically, contiguous polygonal surfaces) making up the object. Defining only the vertices enables a relatively compact representation of a surface which may include a substantial number of picture elements, as well as being independent of the resolution in which the images of the object are reproduced.

According to one aspect of the invention, the computer 100 comprises means 104 for performing an initial operation of sorting the surfaces or regions of the object into an order determining the order in which they will be drawn (ie rendered into the frame buffer 40) so as to draw last those regions which will occlude others. The sorter 104 accordingly reads the object data defined by the definer 102 and generates a corresponding sorted list of regions for subsequent use, prior to drawing and all subsequent animation or movement of the object.

The appearance of the object on a two dimensional screen such as the display unit 50, and consequently the image data stored in the frame buffer 40, is dependent upon the direction from which the object is to be viewed; it may also be dependent upon a defined distance between the object and a notional view point corresponding to the plane of the display unit 50. The computer 100 therefore includes a view control means 106 enabling an operator to define a view direction or direction and distance (for example, by defining the coordinates of a view point and/or a direction), via the input device 30. Rather than defining individual view points one at a time, the input means 30 may be employed to define a trajectory of successive view points or viewing directions, for example by specifying a direction of movement and a speed, so that successively rendered images are animated. The data defining the view direction and/or distance defines a relative distance and direction between the object and the notional plane of the display unit 50 (notional view point); where only a single object is to be displayed, it may allow data to define either the position and orientation of the object or of the screen, since what matters is the relative inclination between the two. On the other hand, where multiple objects at mutually defined positions are to be drawn, the view controller 106 preferably is capable of defining either the view position or a new position for one object at a time, so that either one object may be moved independently or the view may be moved relative to all objects.

Having defined the relative orientation of the object, relative to the viewing plane corresponding to the display unit 50, the computer 100 has the necessary data to enable projection means 108 to perform a projection of the or each three dimensional object (region by region) into the two dimensional viewing plane. Each two dimensional viewing plane region thus projected by the projector 108 is then rendered, in the order previously defined by the sorter 104, by a renderer 110 which fills the region (i.e., allocates a predetermined colour value to each pixel location in the frame buffer 40 which lies within the region). As will be discussed in greater detail below, only regions which face outwardly of the object ("forward facing") are rendered in preferred embodiments; the renderer 110 therefore is arranged to test each region to determine the direction which, in the projected plane, it is facing. Having rendered all regions and written the corresponding image data into the frame buffer 40, the view controller 106 updates the view point, if necessary, and, if it has changed, the projector 108 and renderer 110 re-execute their respective processes as above.

Referring to FIGS. 3a and 3b, the processes performed by the apparatus of FIGS. 1 and 2 therefore may be seen to fall into two groups; those which are performed each time a new view of an object is to be displayed (shown in FIG. 3b), and those performed prior thereto at an initial stage (shown in FIG. 3a). Assuming that at least one object has already been defined in terms of data defining surface regions of the object as shown in FIG. 3a, the sorter 104 is arranged to read the data (S31) and sort the regions to produce a list or plurality of lists defining the order in which the regions will be rendered (S32). Subsequently, as shown in FIG. 3b, when a view is to be drawn the view controller 106 derives the view point data defining the relative disposition of the view point and the object (S41), reads the list or selects one of the lists (S42), and then for each region in turn, in the order specified by the list, the projector 108 decides whether a polygon is forward facing and, if so, calculates the projection of the region into the viewing plane and the renderer 110 renders the projected region (S43-S48). Of course, it would also be possible to calculate the projections of all the regions prior to rendering them in turn (although this would require more memory to store the data defining the projected regions).

Detailed Description of Preferred Embodiment

Figure 4A:
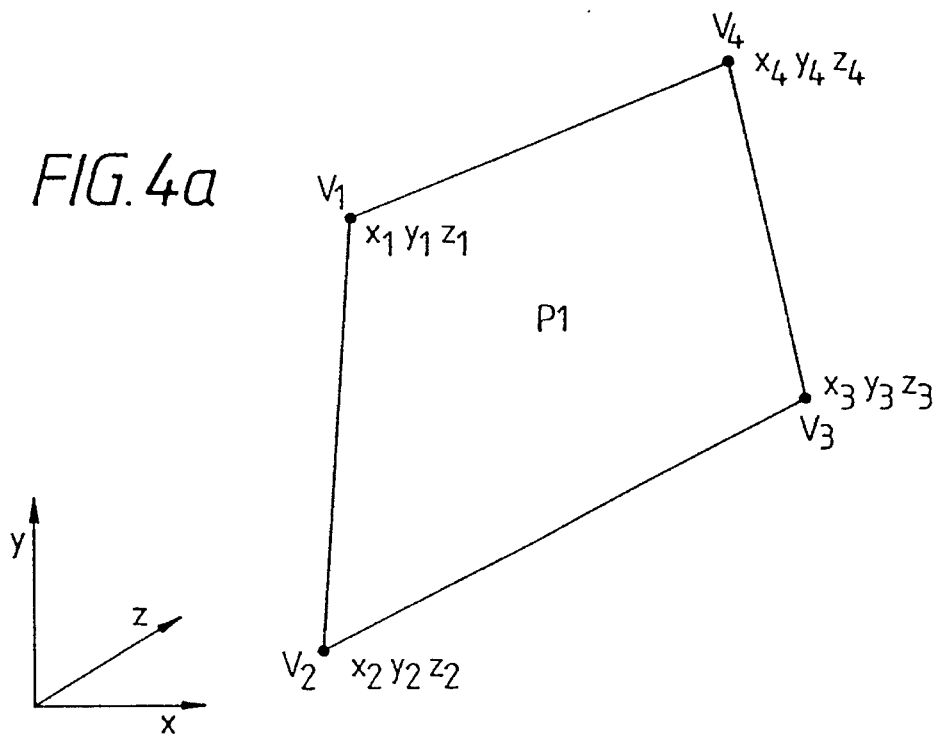
FIG. 4a shows illustratively a polygon.
Figure 4B:
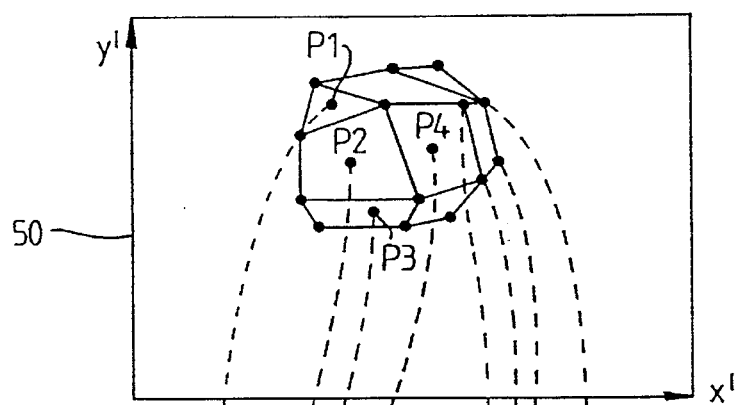
FIG. 4b shows illustratively a display comprising a plurality of polygons.

Referring to FIG. 4a, a polygon P1 is defined by the positions of its four vertices V1-V4, each of which is therefore defined by an X, a Y and a Z coordinate. Referring to FIG. 4b, a representation on the display unit 50 of a three dimensional object is made up of a plurality of polygons P1-P4 etc, each of which is defined by the coordinates in two dimensions of it vertices. The two dimensional coordinates $X'_1$, $Y'_1$, comprise the projection into two dimensions of the three dimensional coordinates $X_1$, $Y_1$, $Z_1$, of each vertex. The plane into which the vertices are projected is defined by a view angle.

The vertices by themselves define a plane. In this embodiment, it is helpful also to define for each polygon a front and back face; these correspond, respectively, to the interior and the exterior of the three dimensional object with the polygon is representing.

One way of defining which of the faces of the polygon is the front or the back is to list the vertices of the polygon in a defined order; for example, to list the vertices in anticlockwise order around the periphery of the polygon when viewed from the front. In order to test the direction in which a polygon is facing, it is then merely necessary to determine whether the vertices of the polygon can be traversed anticlockwise in the same order as that in which they are listed for that polygon; if so, the view corresponds to a front view whereas not, the view corresponds to a view of the back of the polygon and need not be drawn.

Figure 4C:
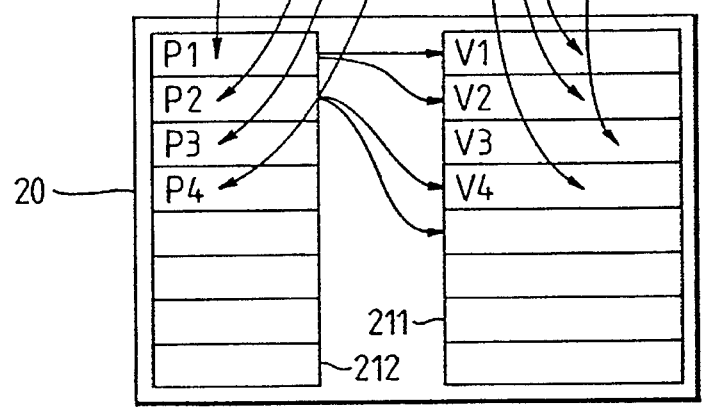
FIG. 4c shows the related data held in a memory forming part of FIG. 1.

Referring to FIG. 4c, within the memory 20 a first table 211 stores data defining the three dimensional position of each vertex V1-V4 (e.g. its X, Y, Z coordinates).

Likewise, a table 212 is provided storing data corresponding to each polygon P1-P4. The data in this case comprises data defining which of the vertices in the table 211 make up that polygon, and defining the direction in which that polygon is facing. Conveniently, therefore each entry in the polygon table 212 comprises a list of the vertices (indicated by their positions in their vertex table 211), the order of the vertices in the list being anticlockwise when facing the front side of the polygon.

Figure 5:
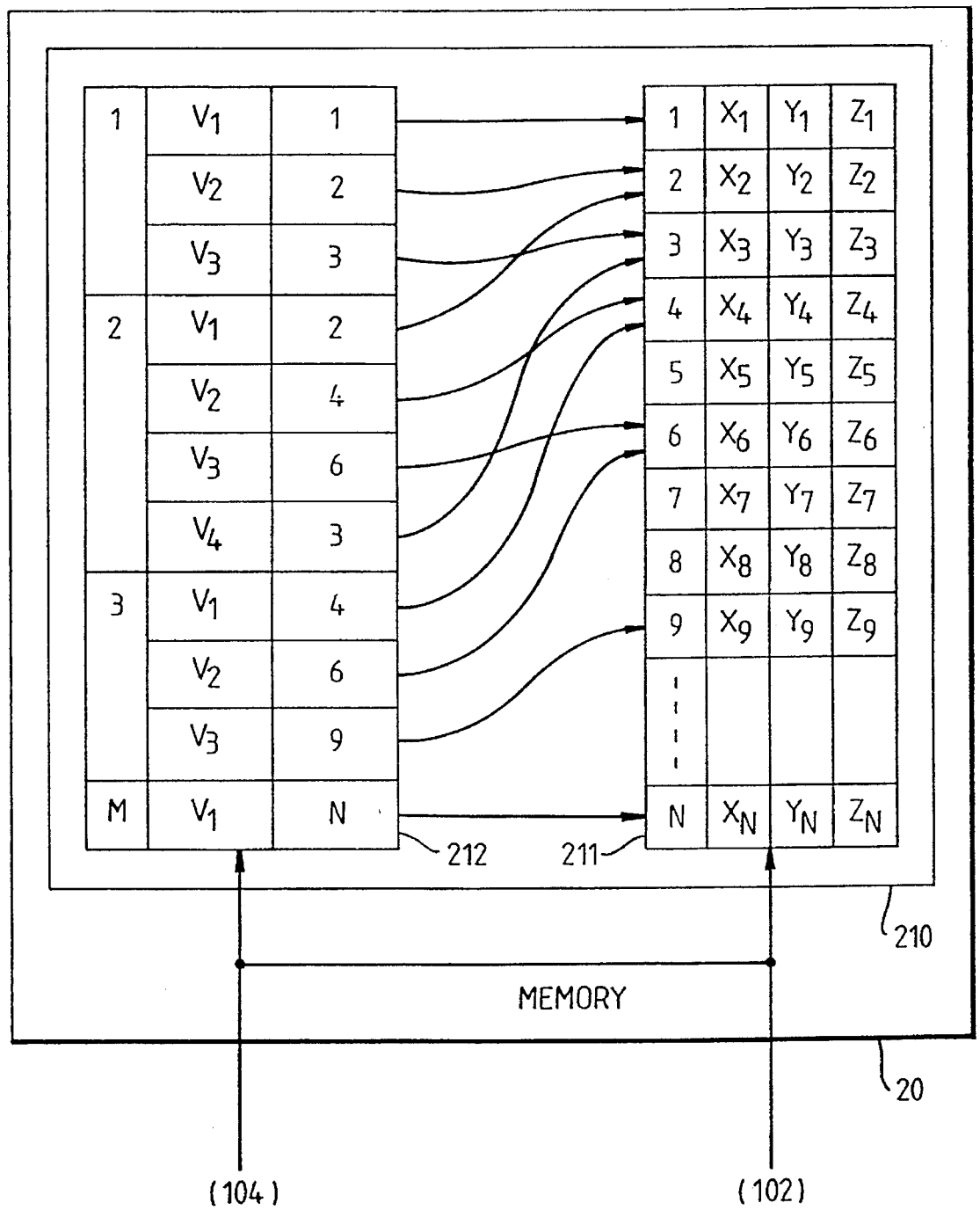
FIG. 5 shows schematically the arrangement of data in a memory forming part of FIG. 4c.

Referring to FIG. 5, the contents of the vertex table 211 provided within a working memory area 210 of the memory 20 comprise sequences of table entries 1-N each comprising X, Y and Z coordinates. Contents of the polygon table 212 comprise a series of entries 1-M, each entry comprising a list $V_1-V_n$ of vertices, each list entry comprising a pointer to the entry in the vertex table 211 to which that vertex corresponds.

This method of separately storing vertex coordinates in a first table 211 and providing pointers thereto from a polygon table 212 is advantageous in allowing editing of the object to be represented, since if the coordinates of a vertex are altered it is merely necessary to alter the entry in the vertex table 211, rather than altering each entry for each polygon in the polygon table 212 of which that vertex forms a part. It is thus straightforward to alter the positions of vertices, without necessary changing the topology of the object they represent.

Figure 6:
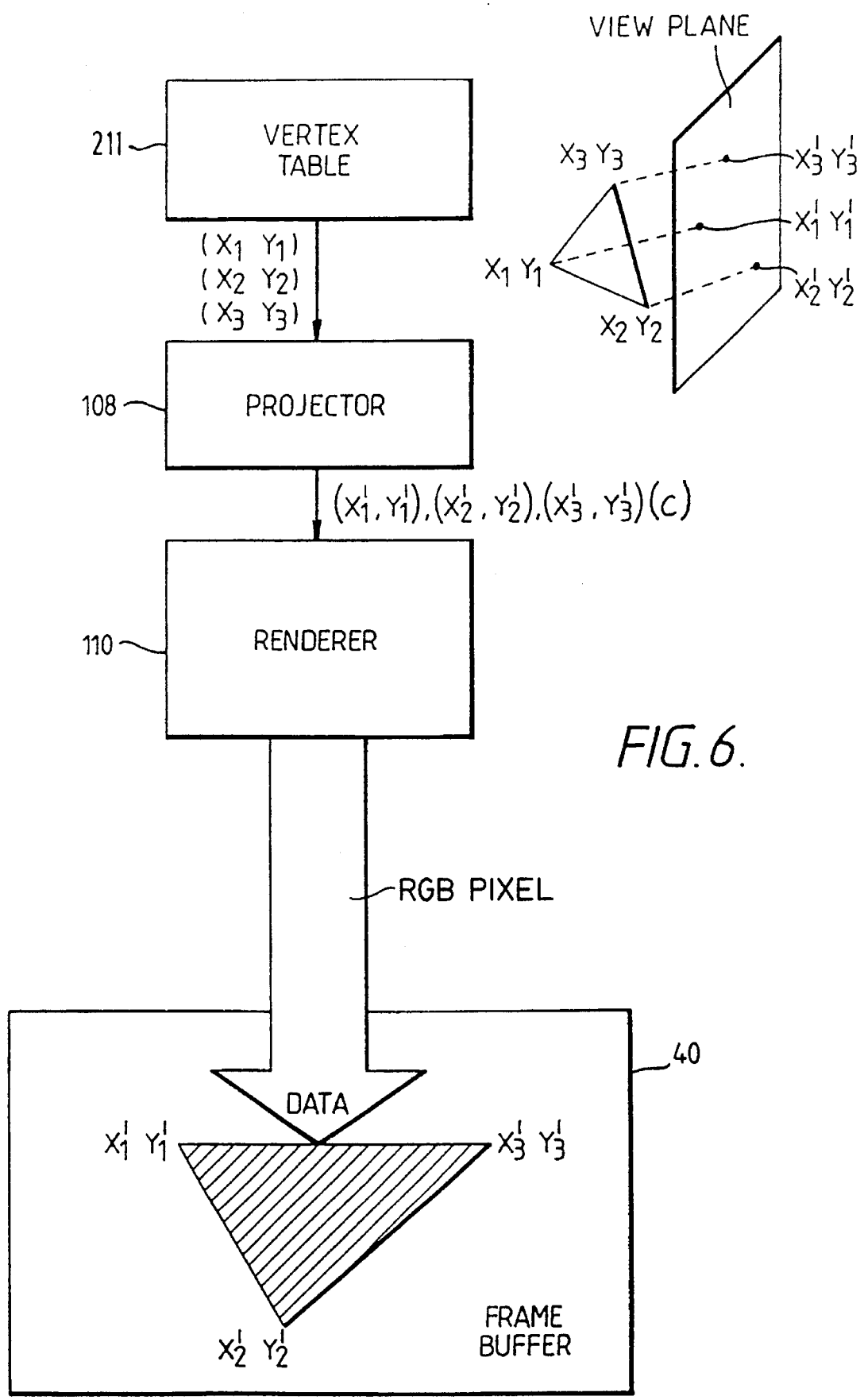
FIG. 6 shows illustratively the flow of data during the operation of the apparatus of FIGS. 1 and 2.

Referring to FIG. 6, in reproducing the display shown in FIG. 4b from the data held in memory indicated in FIGS. 4c and 5, following the process of FIG. 3b, each polygon in the polygon store 212 is processed in turn. The defined view direction supplied by the view controller 106 (as described below), is processed to derive a viewing plane, and the projector 108 accesses the vertex table 211 to read in turn each vertex $V_1, V_2 \ldots$ and to calculate X', Y' coordinates projected into the plane for each.

Figure 7:
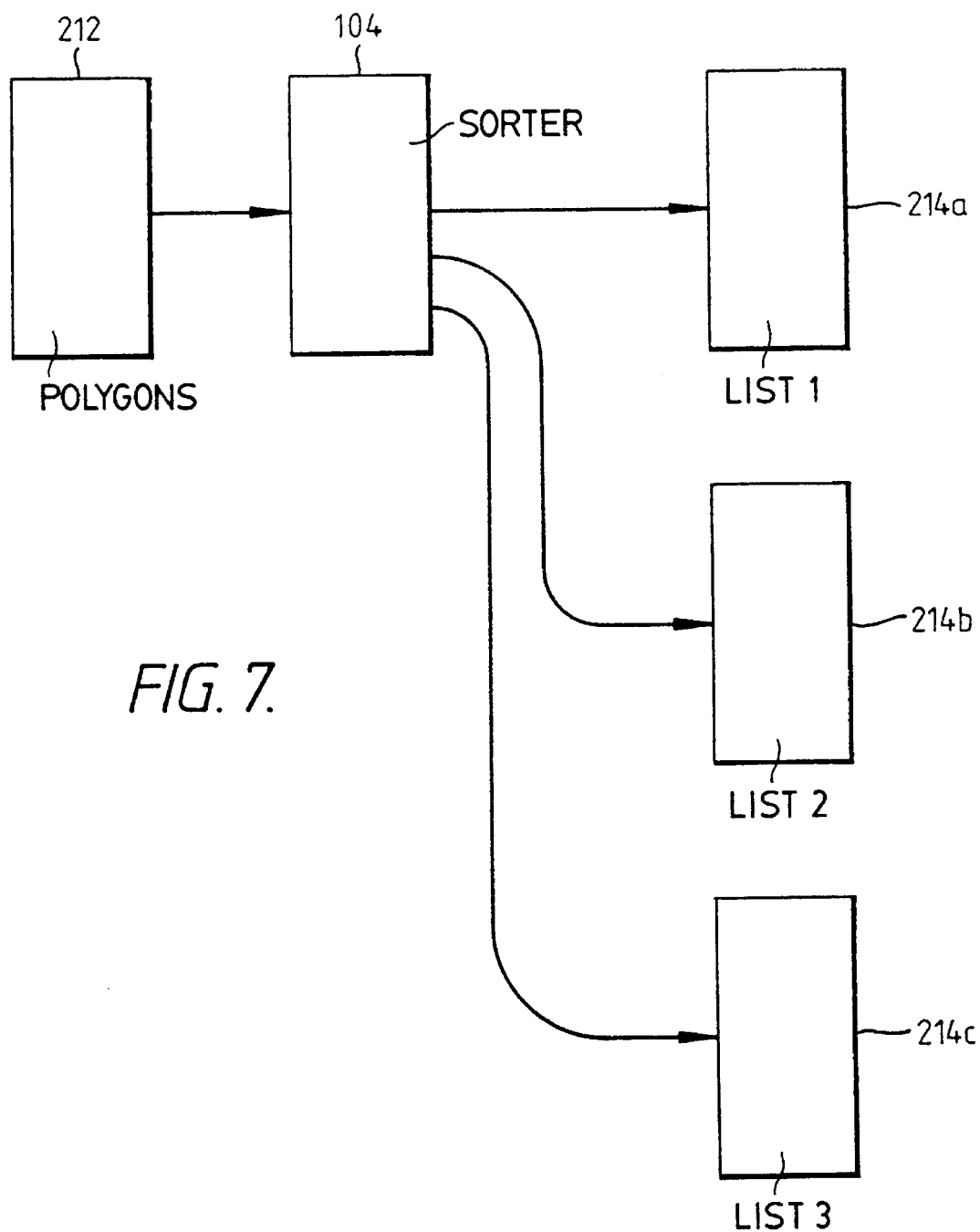
FIG. 7 shows schematically the operation of a sorting means comprising part of the apparatus of FIG. 2.

The projector 108 therefore produces a corresponding two dimensional coordinate list $X'_1, Y'_1, X'_2, Y'_2, \ldots$ The next step, shown in FIG. 7 is to test whether the polygon is forward or backward facing, i.e. whether traversing the projected vertices in the viewing plane in the order in which they are listed leads to a counter clockwise rotation or a clockwise rotation in the view plane. If the polygon is backward facing, it is not to be displayed for reasons discussed above and the next polygon from the polygon table 212 is selected. If the polygon is forward facing, the vertex coordinates are supplied to the renderer 110 which in conventional fashion generates a plurality of pixel data points for storage in the frame buffer 40 corresponding to pixel values lying within the polygon projected in the view plane.

The renderer may apply a brightness/shading dependent upon the angle between the polygon plane and the viewing plane; this may be calculated by the projector 108. The polygon may also be rendered in a particular colour; this colour may for example be stored in the polygon table entry for that polygon. A value c denoting the colour to be applied to pixels of the polygon is therefore supplied to the renderer 110.

The foregoing processes are of themselves known to the skilled reader, and the above description is for ease of reference only. Further exemplary details of the projector 108 and renderer 110 are given below. The operation of the sorter 104 in accordance with the invention will now be described.

As shown in FIGS. 4c and 5, the polygon table 212 comprises a plurality of entries, one for each polygon. The order of the polygons in the table 212 will initially have been derived from the definer 102 (i.e. set up during the process of defining the object either from the keyboard or from the mass storage device 60). The sorter 104 reads the polygon table 212 and generates therefrom at least one sorted polygon table; preferably three sorted polygon tables 214a, 214b, 214c, in each of which the polygons are listed in the order in which they are to be drawn, as shown in FIG. 7. The sorter 104 determines the order in which polygons are to be drawn on the principle that a given polygon should be drawn before those which are in front of it which could occlude it and after those which are behind it which it might occlude, so as to perform hidden surface removal.

Figure 8A:
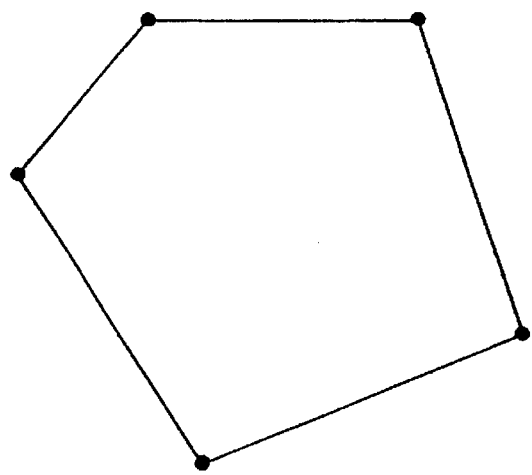
FIG. 8a and FIG. 8b show respective examples of objects.

Referring to FIG. 8a which shows a two dimensional section through a three dimensional object, it can be verified by eye that where (as here) an object is completely convex, then from any viewing angle, any given polygon is either backward facing (and hence not drawn) or forward facing but positioned so as not to occlude any other. Thus, in the case of a completely convex object, provided the direction in which each polygon is facing is tested and backward facing polygons are not drawn, the order in which forward facing polygons are drawn is unimportant since they cannot mutually occlude one another.

Figure 8B:
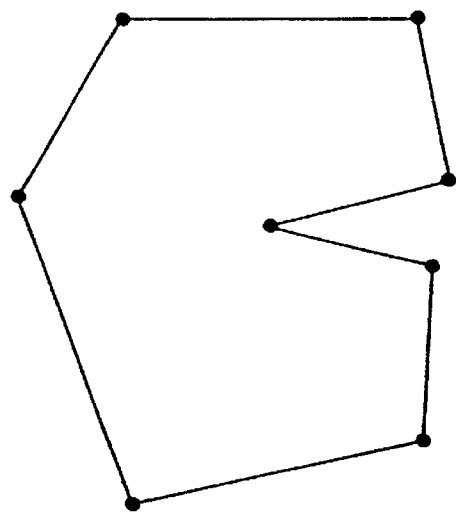

However, this ceases to be true when an object includes a concavity as shown in FIG. 8b since in this case there are viewing angles from which two polygons lie one in front of the other, both forward facing. In this situation, the "outer" or forward of the two polygons will from some angles occlude the inner or backward of the two. We have observed that the total number of such potentially occluding polygons (i.e. those which lie, forward facing, in front of other forward facing polygons) is generally relatively low.

Figure 9:
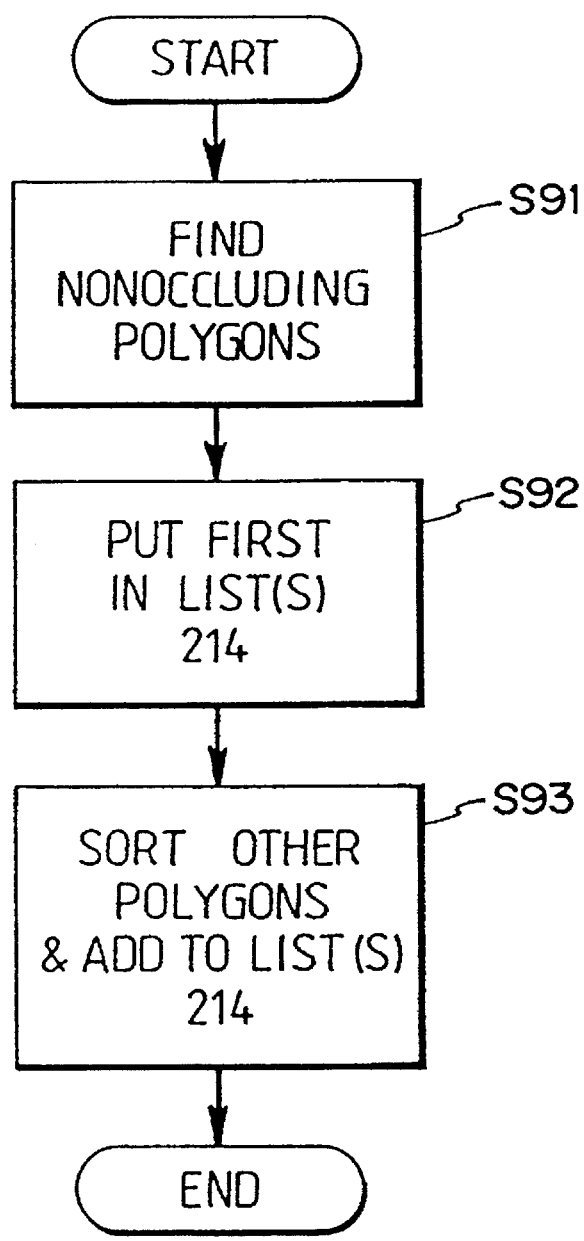
FIG. 9 is a flow diagram showing in greater detail the process of FIG. 3a according to a preferred embodiment of the invention.

Accordingly, in this embodiment of the invention, referring to FIG. 9, the sorter 104 operates to sort in two stages; a first stage in which those polygons which may potentially occlude others are separated from those which will not (S91). The latter category (which in many cases will make up the majority of polygons of a three dimensional object, since many objects are essentially convex in nature) may be drawn first and in any order (S92). The former category are drawn afterwards, in an order which is determined by the sorter 104 (S93).

Figure 10A:
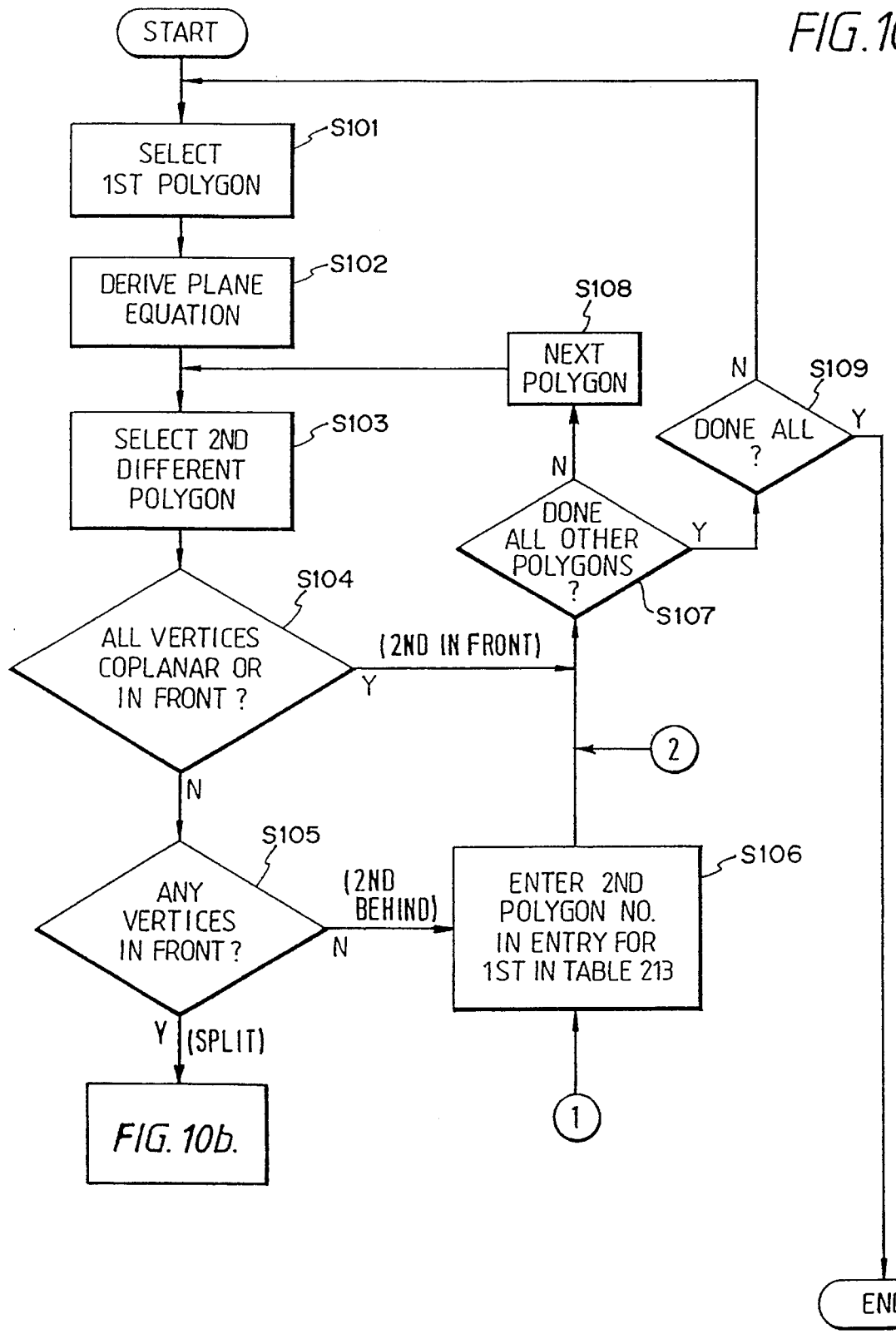
FIGS. 10a and 10b are flow diagrams showing in greater detail part of the process of FIG. 9 according to one embodiment of the invention.
Figure 10B:
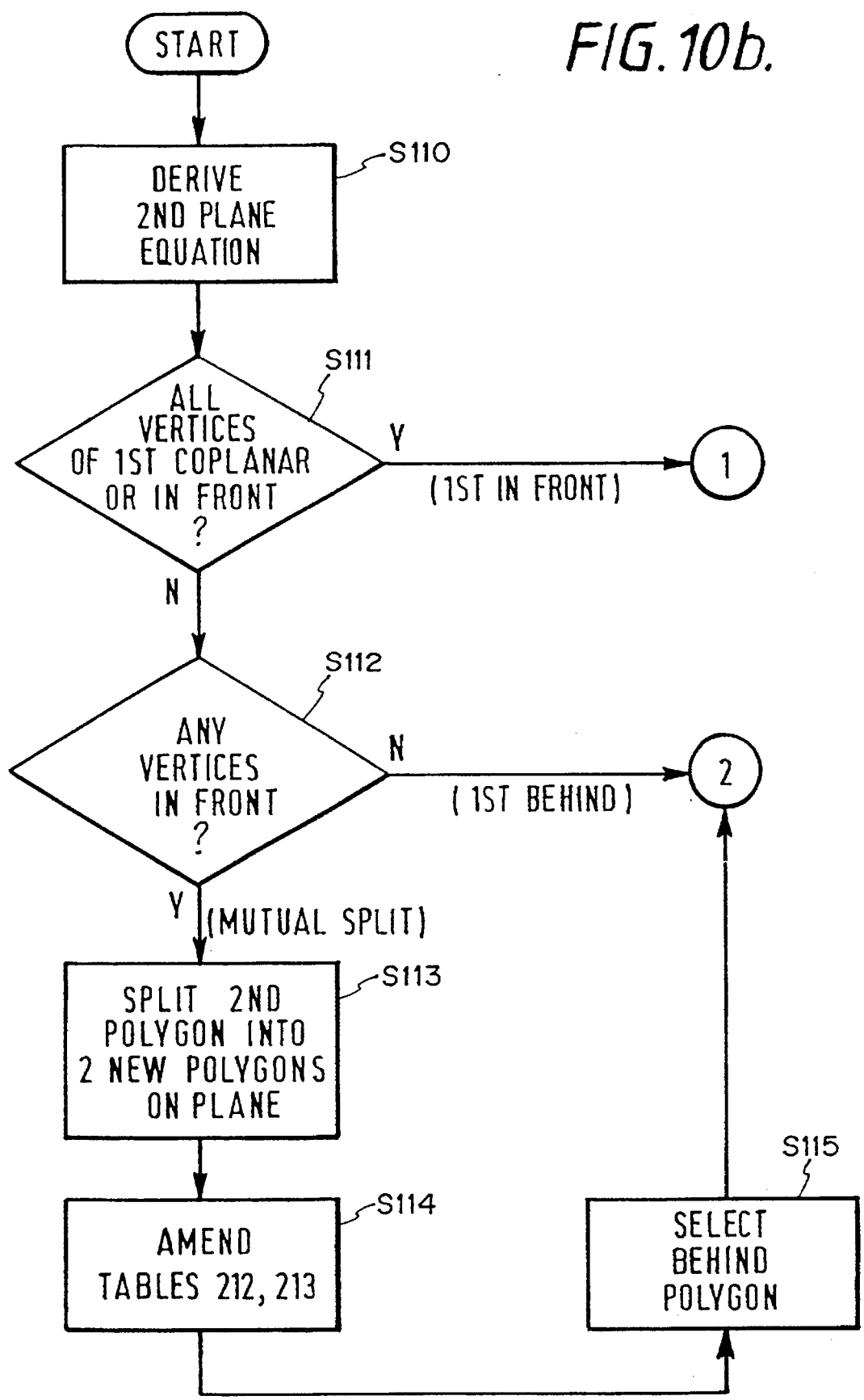
Figure 11:
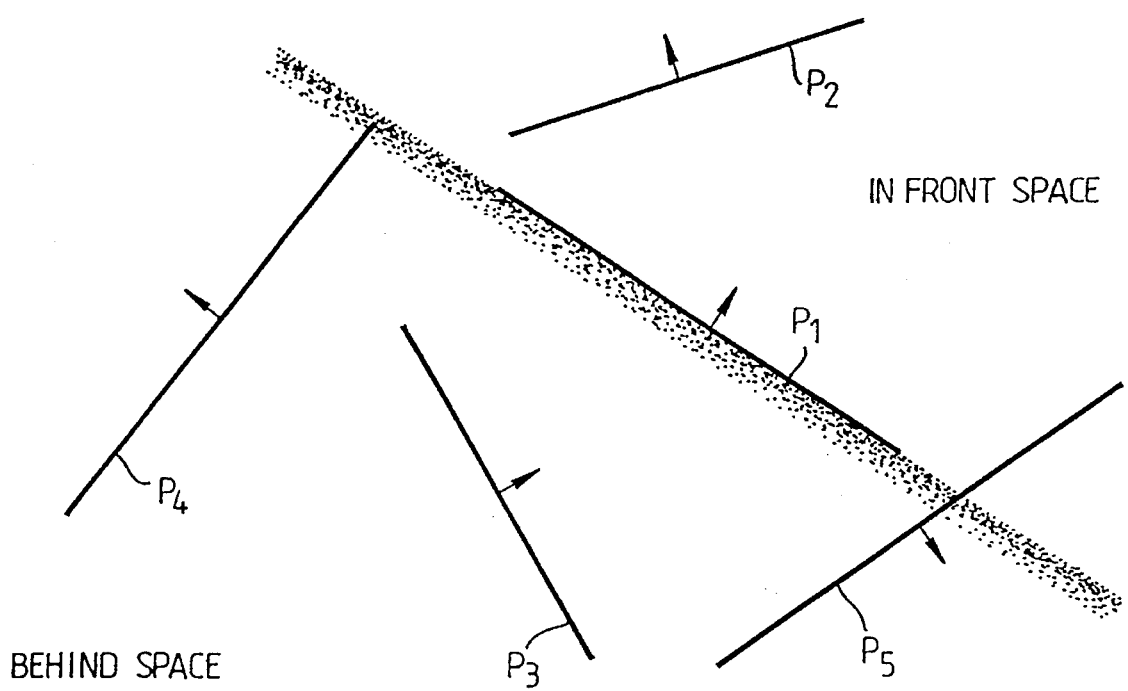
FIG. 11 illustrates the possible spatial relationships between polygons.

Referring to FIGS. 10a and 10b, a first stage in the process of classifying polygons as occluding or non-occluding is shown in this stage, each polygon in turn is considered and, as shown in FIG. 11, every other polygon is compared with that polygon to determine whether the other polygons lie behind or in front of the plane of that polygon. A polygon is considered to lie in front of the plane if all its vertices lie in front; to avoid indeterminacy, a polygon is also considered to lie in front of the plane if some vertices are in front and others are in the plane (or within a prescribed tolerance distance of the plane), or if all are in the plane.

Thus, referring to FIG. 11, with reference to the plane defined by the polygon P1, the polygon P2 lies in front of this plane. The polygon P3 is considered to lie behind P1 since all its vertices lie behind the plane. The polygon P4 has one vertex approximately on the plane, and all others behind the plane; it is therefore considered to lie behind the plane. The polygon P5 has some vertices in front of the plane and others behind. This polygon cannot be classified either as lying in front or behind the plane.

Referring once more to FIG. 10a, the sorter 104 takes in turn each polygon in the list 212 (S101) and, firstly, derives the coefficients of the plane equation of the polygon $Ax+By+Cz+D=0$ from the coordinates of the vertices V1, V2, V3 (etc), as a set of simultaneous equations (S102). The sorter 104 then examines in turn each other polygon in the table 212 (S103) and determines, for that polygon, whether all the nodes of that polygon satisfy the inequality $Ax+By+Cz+D>0$ (S104). If the inequality is met for all vertices of the first, comparison, polygon, that polygon lies wholly in front of the first and the sorter 104 proceeds to the next other polygon (S107, S108). If all nodes are coplanar or behind, so that $Ax+By+Cz+D \leq 0$, the second polygon lies wholly behind the plane of the first, when viewed normal to that plane (S105, NO). The sorter 104 creates a new table 213 containing an entry for each polygon in the table 212, each entry comprising a set or list of the numbers of the other polygons which lie behind that polygon (S106). Each time every node of a polygon lies behind the plane of another, an indication of the identity of that polygon is recorded in the "behind" list associated with other in the table 213.

Where the second polygon crosses the plane of the first as with P5 of FIG. 11, so that some nodes are in front and some behind (S105, YES), then it becomes slightly more difficult to classify the polygon as behind or in front. At this point, in this embodiment, it will be possible to derive an ordering for the two polygons if one crosses the plane of the other or vice versa, but it will not be possible if each polygon crosses the plane of the other. Accordingly, referring to FIG. 10b, where the second polygon crosses the plane of the first the sorter 104 then derives the plane equation of the second polygon (S110), and tests (in the same manner as discussed above) whether the first polygon lies in front or behind the second (S111, S112). If the first polygon lies in front of the second polygon, then the second lies behind the first and the sorter 104 enters an identification of the second polygon in the entry in the table 213 relating to the first (S106). If the first polygon lies behind the second, then the second polygon lies in front of the first and the sorter 104 proceeds to select a further first polygon (S107–S109). If the second polygon crosses the plane of the first, then each polygon crosses the plane of the other, and the second polygon is split into two along the planes, so as to be replaced by one polygon lying wholly behind the plane and another lying wholly in front (S113). To achieve this, the coordinates of new vertices lying on the plane of the first polygon are derived by linear interpolation between the coordinates of the vertices which lie behind and in front of the plane, so as to meet the plane equation. The corresponding entry in the polygon table 212 and table 213 is replaced by two entries, one for each of the new polygons. Reference to the new polygon which lies wholly behind the plane is inserted in the entry in the table 213 corresponding to the first polygon (S114, S115).

The process of splitting a polygon as described above is therefore performed only when the later ordering process will be unable to order the two polygons without the splitting; i.e. where each intersects the plane of the other. This is to be contrasted with the polygon splitting step employed by the binary space partitioning technique, in which a polygon is split each time it crosses the plane of another. The above described embodiment therefore leads to far fewer occasions where a polygon is split, and consequently avoids the increase in number of polygons which is observed with binary space partitioning, thus considerably increasing the speed both of the initial sorting process and of the eventual traversing of the list in real time projection.

Thus, after one such cycle, a first set in the table 213 corresponding to a first polygon in the table 212 is built up. The cycle is then repeated for each other polygon in the table 212. Where, subsequently, a polygon is split then reference to that polygon in the sets of the table 213 in each case is replaced by reference to the pair of split polygons.

Thus, once the process shown in FIG. 10 is completed (S109, YES), the table 213 comprises a set of lists, one for each polygon in the table 212, each comprising the polygons which lie behind the plane of that polygon.

If a second polygon lies wholly behind the plane of the first, it cannot occlude the first when the first is facing forwards and therefore may always be drawn before the first (and when the first polygon is facing backwards, it is not drawn). However, this information cannot of itself lead to a satisfactory ordering of the polygons since in a solid object every polygon will have another behind it which would need to be drawn before it.

As mentioned above, the sorter 104 preferably uses a topological sort to determine the order in which the polygons are to be drawn. The data held in the tables 213 is unsuitable to be sorted using a topological sort since the topological sort requires a starting point comprising a first step which is not required to be proceeded by any other. In the case of a solid three dimensional object, every polygon or region in the surface of the object has another polygon or region behind it since it is solid; thus, every entry in the table 213 for a polygon indicates that at least one polygon lies behind that polygon. Accordingly, a topological sort cannot even start to order the polygons on the basis of the data held in the table 213.

Figure 12:
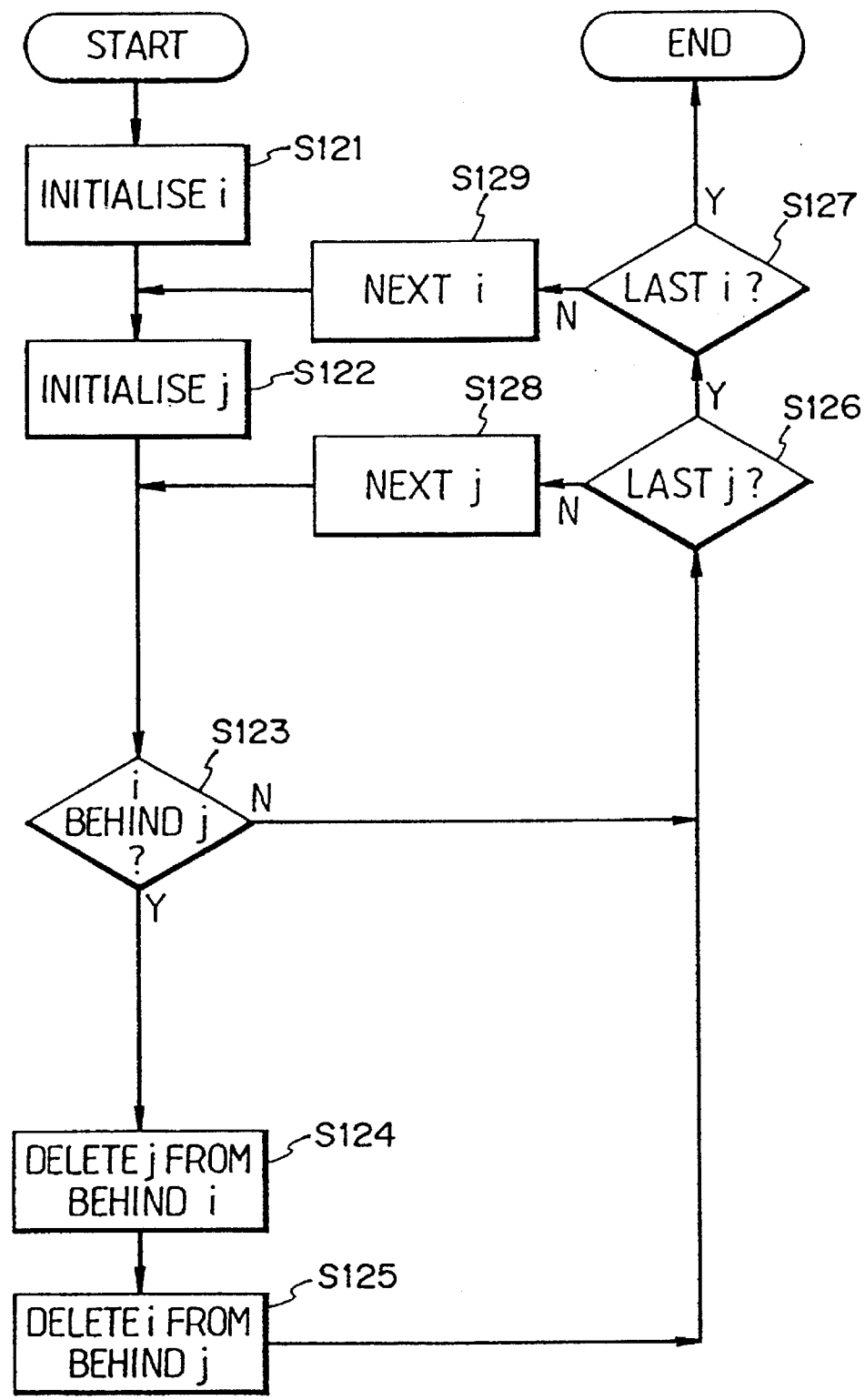
FIG. 12 is a flow diagram showing a further part of the process of FIG. 9 according to the embodiment of FIGS. 10a and 10b.

Referring to FIG. 12, the sorter 104 therefore performs a second operation to process the data held in the table 213 to a form which can be topologically sorted, which discriminates between potentially occluding and non-occluding polygons. The process comprises taking, in turn, each polygon i in the table 212 (S121) and examining the corresponding list in the table 213 of polygons which lie behind the plane of that polygon (S122). For each "behind" polygon j in the table entry 213, the corresponding entry in the table 213 is examined to see whether the first polygon i is included (i.e., if each of the polygons lies behind the plane of the other) (S123). If this is the case, then each polygon is deleted from the entry in the table 213 of the other (S124, S125). The process is repeated for all entries in the table 212 (S126–S129), so that after execution of the routine of FIG. 12, no mutual entries (i.e. pairs of polygons in which each polygon appears in the behind set of table 213 relating to the other) exist.

By referring back to FIG. 8a, it will be seen that in the case of a convex object, every polygon lies behind the plane of every other and no polygon can occlude any other. Referring to FIG. 11, however, and considering the polygons P1 and P3, whereas P1 lies in front of P3, P3 does not lie in front of P1. It is likewise apparent that, whereas P3 cannot occlude P1 from any angle in which both face forwards, P1 does occlude P3 from certain viewing angles. The condition that, considering a pair of polygons, each lies behind the plane of the other is therefore a test for whether neither can occlude the other. The process of FIGS. 10 and 11 therefore effectively discriminates between potentially occluding polygons and non-occluding polygons, since after the execution of FIGS. 10 and 12, polygons which occlude no others will include no other polygons in their entries in the table 213.

The routine of FIGS. 10 and 12 is not the only method of separating occluding and non-occluding polygons, or of providing data suitable for topological sorting. For example, it is relatively trivial to reverse the logic of FIG. 10 and to generate an entry where a given polygon is in front of another. Further, it may be preferable in practice to merge the processes of FIG. 10 and FIG. 12 so that, in FIG. 10, before entering a polygon in an entry in the table 213 a test is performed to see whether a mutual entry exists already in the table 213 and, if so, the polygon is not entered and the mutual entry is deleted; in this manner, the two processes of FIGS. 10 and 12 are merged. Equally, entirely different methods of testing for the possibility of occlusion (based, for example, on tests of relative polygon position and angular orientation) could be used.

This enables the sorter 104 to perform a topological sort, since such polygons with empty entries in the table 213 may freely be drawn before any others.

An alternative method of compiling a table 213 for the topological sort is similar to that of FIGS. 10a, 10b and 12 except that where, as a result of a comparison, a second polygon lies behind a first then in addition to entering the second in the entry in the table 213 of the first, the polygons (if any) within the entry for the second are also entered within the entry for the first, and the first is not compared with those polygons. This considerably reduces the time taken by the processes of FIGS. 10a, 10b and 12. An entry in the table 213 now no longer strictly defines polygons which are behind or occluded by that to which the entry relates, but still defines those which should be drawn before that polygon and hence can still be used to provide an ordered list.

Figure 13:
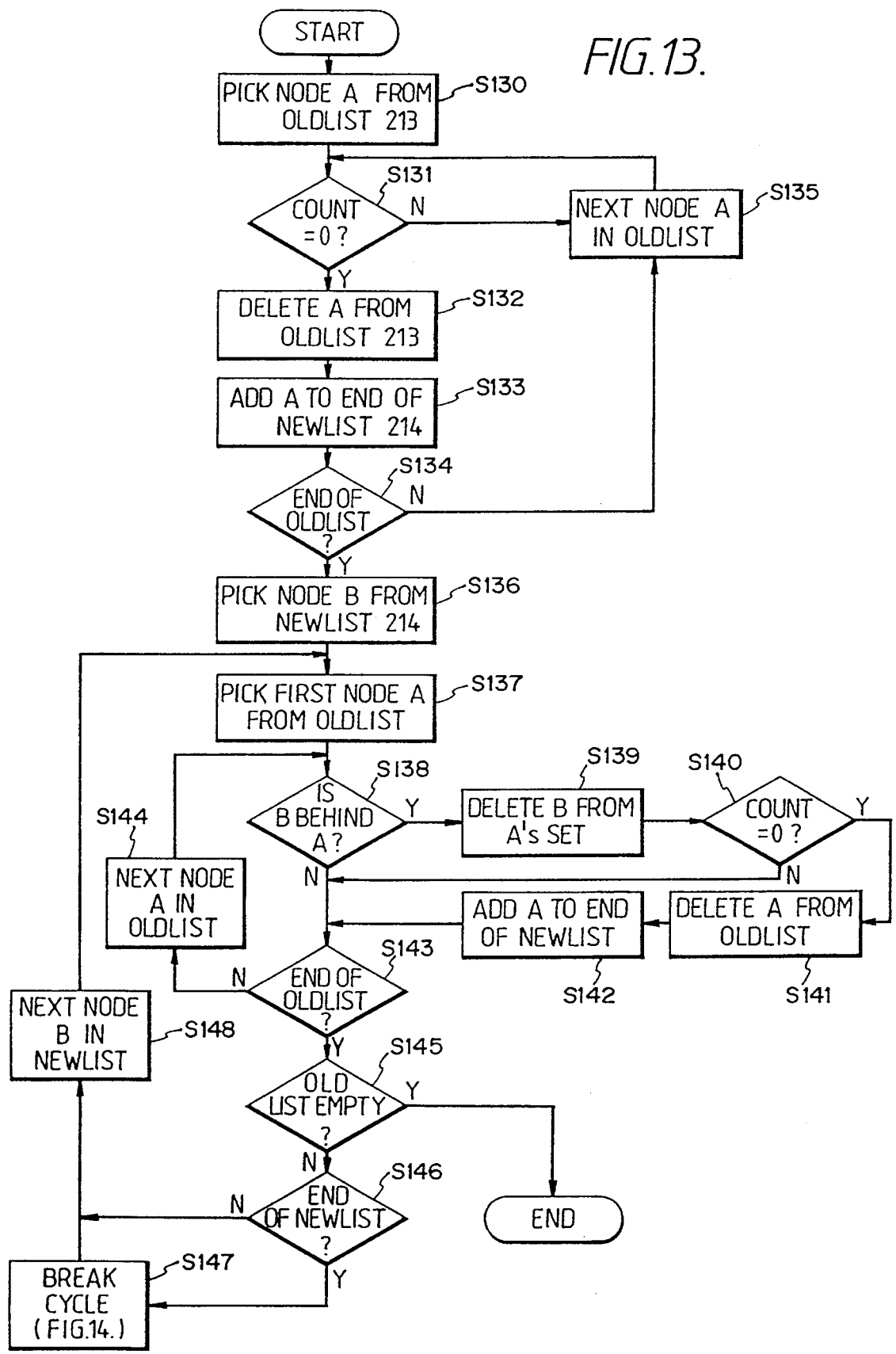
FIG. 13 is a flow chart showing a further part of the process of FIG. 9 according to the embodiments of FIGS. 10a and 10b and 12.

Referring to FIG. 13, a flow diagram showing a topological sort is illustrated. The sort examines the entries in the table 213 which represent the old list of polygons and generates a new list of polygons 214 as a table in the memory 20 in an order relating to that in which they are to be rendered.

Firstly, the sorter 104 examines in turn each entry in the table 213 an counts the number of behind polygons stored in that entry (S130, S131, S134, S135). If there are no such behind polygons (S131 YES), then the entry is deemed to relate to a non-occluding polygon and that polygon is added as the next entry in order in the list 214 (S133). The entry is also deleted from the table 213 (S132). The particular order within the list 214 in which such non occluding polygons is entered is unimportant.

Next, the topological sort itself is performed, to order the occluding polygons, as follows. A first polygon B at the start of the new list is selected by the sorter 104 (S136) and is compared in turn with each of those remaining with entries in the table 213 (S137, S138, S143, S144). Where the test polygon B from the new list occurs in an entry A in the table 213, it is deleted therefrom (S139); if after the deletion there are no other polygons in that entry in the table 213 (S140, YES), then the polygon to which that entry relates is not in front of, and cannot occlude, any remaining polygon in the list 213 and, that polygon entry is deleted from the table 213 (S141) and added as the next entry to the new list 214 (S142). After the test polygon from the new list 214 has been matched against every entry in the table 213 (S143, S144), the next polygon in the new list 214 is selected by the sorter 104 (S145–S148) and the process is repeated, so that further polygons are transferred from the old table 213 to the new list 214 in order in which they can be drawn.

To assist understanding of this embodiment a simplified example comprising a projection in two dimensions of a three dimensional object will now be considered.

Figures 14, 15:
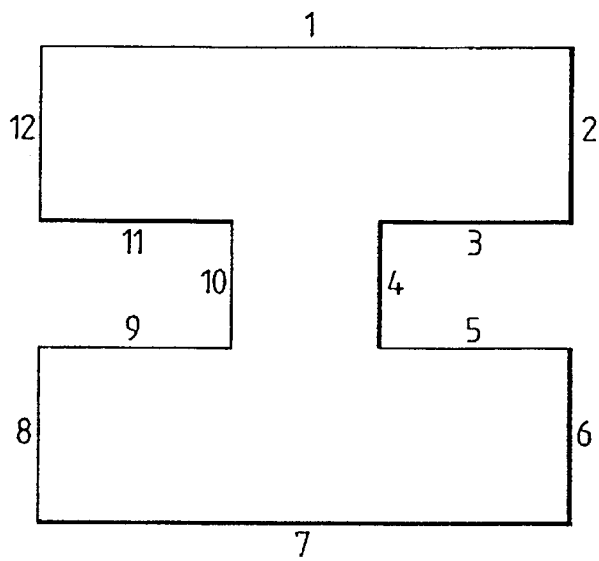
FIG. 14 is an exemplary two dimensional projection of a three dimensional object.
FIG. 15 shows the corresponding contents of a table forming part of the memory of FIG. 1 derived by the process of FIGS. 10a and 10b.

Referring to FIG. 14, a two dimensional object in the form of an I-beam is shown, in which each line (in two dimensions) represents the polygon in three dimensions. The polygons are numbered 1–12; this initial order is not significant. Each polygon is facing outwards of the interior of the object.

On execution of FIG. 10, the sorter 104 generates the table 213 as shown in FIG. 15. The entries in the table corresponding to the inner polygons P3–P5, P9–P11, lying within the concavities of the object include only a limited number of other polygons in the corresponding entries in the table 213; since only a subset of polygons lie behind these inner polygons, the remaining polygons lie in front and may therefore potentially occlude these polygons.

After the sorter 104 performs the process of FIG. 12, a number of entries in the table 213 are amended as shown in FIG. 16. The processing corresponds to the removal of mutual references to one another by polygons which cannot occlude one another. The polygons P3, P5, P9 and P11 have empty entries in table 213 and are thus shown to not be capable of occluding any other polygon. It is therefore possible at all times to draw these four polygons first. The entries for the remaining polygons P1, P2, P4–P8, P10 and P12 show the polygons which each can occlude from some view angle.

The sorter 104 then performs the process of FIG. 13. The first four entries in the table 214 are therefore occupied by references to polygons P3, P5, P9 and P11, and the remaining entries in the list are filled one by one during the sort process, to give the list 214 shown in FIG. 17.

Figure 17:
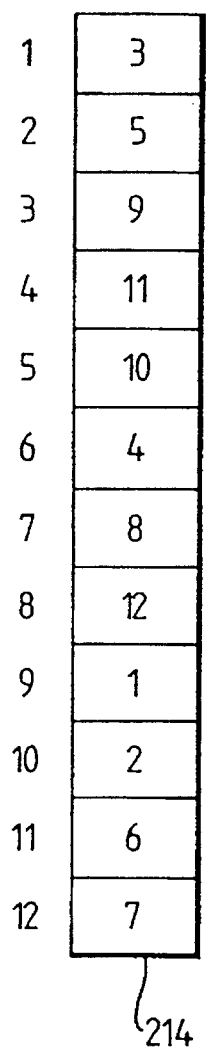
FIG. 17 shows a further table corresponding to part of FIG. 7 derived from that of FIG. 16 by the process of FIG. 13.

The object depicted in FIG. 14, may therefore be drawn, from any angle, by rendering the polygons in the order in which they appear in the list 214 shown in FIG. 17; that is, P3, P5, P9, P11, P10, P4, P8, P12, P1, P2, P6, P7; provided that backwards facing polygons are not rendered at all. This particular order is not unique in meeting this requirement; for example, the order within the first four polygons of the list may be interchanged and similarly that within the last four polygons in the list.

Figure 18:
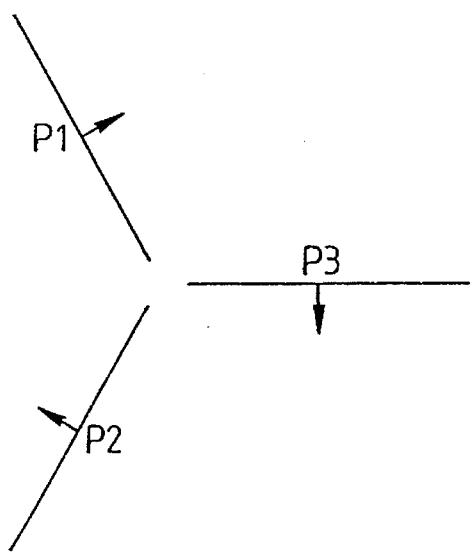
FIG. 18 shows a cyclical arrangement of polygons.

In the above described example, it was possible to derive a single list 214 which could be used to specify the order in which polygons were to be rendered, regardless of the viewing angle. However, in more complex three dimensional objects this is not invariably possible. Specifically, situations can arise in which several polygons are arranged in space so that each may, when viewed from particular angles, occlude another. One example of such an arrangement of polygons is shown (in two dimensional projection) in FIG. 18. This leads, applying the above logic, to the requirement that each much be drawn before the others which would cause any sorting process of the above described type either to stall or to cycle.

Accordingly, to take account of the occurrence of such situations, a preferred embodiment provides some means for breaking such a cycle or halt. Preferably, this is achieved by specifying a limited number of different viewing directions (for example, orthogonal axes), and generating a corresponding list 214a, 214b, 214c for each. Initially, the first entries in each list may be the same. However, when a cyclical group of polygons is reached, the cycle is resolved by selecting the next polygon on the basis of occlusion of distance along the viewing axis.

Providing an defined viewing axis enables the question of which polygon lies in front or occludes another to be determined for that axis, and enables the next entry in the corresponding list to be derived accordingly. At this point, the polygon chosen for each of the list 214a, 214b, 214c may differ.

Figure 19:
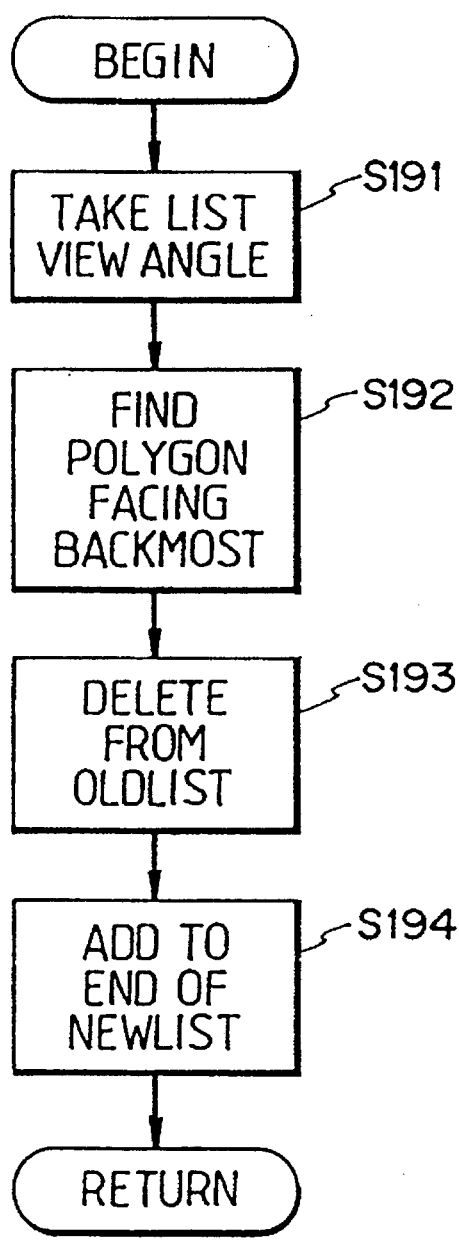
FIG. 19 shows in greater detail a part of the process of FIG. 13 executed when an arrangement corresponding to FIG. 18 is encountered.

Referring to FIG. 19 (see S147 in FIG. 13), one example of a suitable cycle breaking function is to derive, for each remaining polygon to be sorted, the normal vector to the plane of the polygon (indicating the "forward" direction for the polygon) and compare this to the taken viewing direction (S191); for example, by taking the dot products between the two vectors. The closer the angular alignment between the two, the further backwards the polygon in question is facing. The most backward facing polygon is then selected (S192) as the next entry for the list 214 (i.e. the next to be drawn) (S193, S194). The routine of FIG. 13, then continues with this entry in the list 214.

Figure 20:
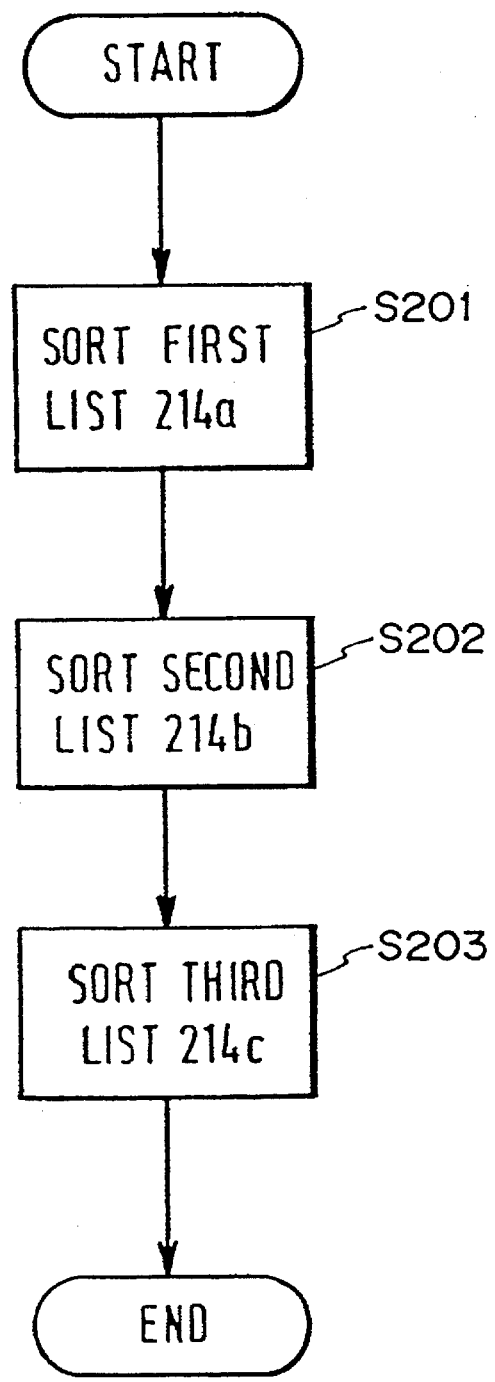
FIG. 20 is a flow diagram corresponding to the block diagram of FIG. 7.

As shown in FIG. 20, the sorter 104 generates a plurality of lists 214a, 214b, 214c in turn as described above, except that the cycle breaking routine refers to a different view axis in each of the lists (S201, S202, S203). Since, as detailed above, the process of generating the lists is destructive of the contents of the table 213, after executing the process of FIG. 12 but before executing that of FIG. 13, the computer 100 may make a copy of the table 213, so that after constructing the list 214a, the copy may be used as the starting point for constructing the list 214b and likewise for 214c.

Since in most cases the initial entries in the lists 214a, 214b, 214c will be the same, the sorter 104 may be arranged to note the occurrence of the first use of the cycle breaking routine in constructing the first list 214a, and to copy the entries in the list up to that point into the list 214b and 214c, and to start the subsequent sort at that point so as to reduce the length of the sorting operation. Many other modifications to the sorting process are equally possible.

Where, after the list(s) 214 have been derived by the sorter 104, the object is edited using the editor 102, in preferred embodiment the sorter 104 does not re-evaluate the entire table 213 but instead makes use of the spatial information held in the table 213 and/or list 214 to limit the number of comparison and/or sorting operations. This further reduces the delay caused by editing, making it more interactive.

After the completion of the process of FIG. 20, the apparatus of FIG. 1 and FIG. 2 may be used for interactive graphics. In use, the operator specifies a view direction, either by defining the direction directly (by typing in data through a keyboard or manipulating a mouse 30) or by specifying a motion (for example a rotation of the object), from which the view controller 106 calculates a series of successive view positions and/or angles for successive displayed frames.

The view controller then compares the view direction with the direction which correspond to those employed to break cycles in each of the lists 214a, 214b, 214c, and the list derived using a direction closest to the view angle is selected for use in rendering the frame. For example, the dot product between the view direction (expressed as a vector) and each list direction (likewise expressed) may be derived, and the list corresponding to the largest dot product selected.

The projector 108 then read, in turn, each polygon in the selected list 214. The number of the polygon is employed to look up the corresponding entry in the polygon table 212, from which the entries in the vertex table 211 corresponding to the vertices of the polygon are read in turn and the projections into the view plane are derived as follows.

Figure 21:
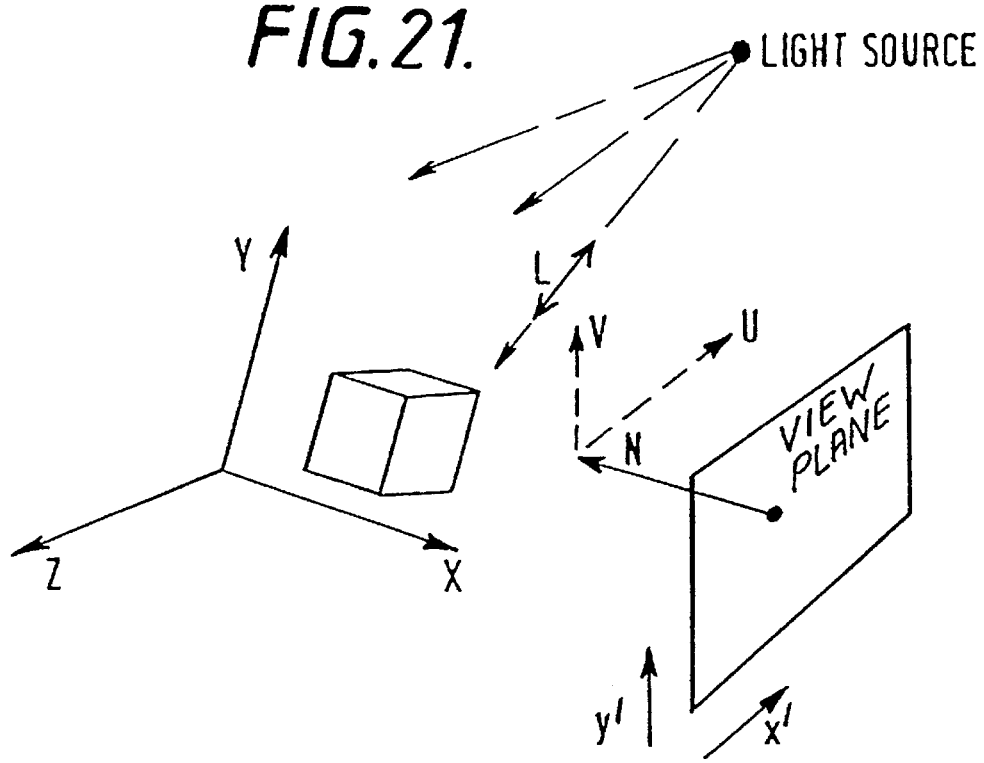
FIG. 21 shows illustratively the relationship between the coordinates of the object, the display view plane and an illumination source.

Referring to FIG. 21, where the coordinates coordinates in space of a vertex are x, y, z, a transformed set of coordinates are generated by multiplication with a transformation matrix:

$$(x\ y\ z\ l) \begin{bmatrix} a & b & c & d \\ e & f & g & h \\ i & j & h & l \\ m & n & o & p \end{bmatrix} = (X\ Y\ Z\ W)$$

Such a matrix can, of course, be used to effect any affine transformation (for example, rotation, translation or scaling) depending upon the coefficients a–p, but for present purposes no scaling is effected and the constants d, h, l, p are all zero, and the transformed scale value W is not used.

Referring once more to FIG. 21, the direction of the vector N normal to the viewing plane, in the global coordinate system of the object, has components Nx, Ny, Nz. The amount by which the viewing plane is twisted, relative to the object, about the normal N is described by two normal vectors indicating the directions, in the global coordinate system, of the x and y axes of the view plane; these are denoted U, V respectively. The transformation matrix for generating projected vertices is then given by:

$$\begin{bmatrix} Ux & Vx & Nx & O \\ Uy & Vy & Ny & O \\ Uz & Vz & Nz & O \\ Tx & Ty & Tz & O \end{bmatrix}$$

Where Tx, Ty, Tz indicates an optional translation between the object and the view plane. The transformation matrix is therefore constructed by the projector 108 from input data defining the normal to the view plane, the twist of the view plane about the normal, and the translation between the view plane and the object.

If the object is to be displayed in orthographic projection, all that is then necessary is to take the X, Y values as X', Y' values for each vertex, and ignore the Z value. If the object is to be displayed in perspective projection, so that points further away appears smaller, the X, Y coordinates are divided through by the Z (depth) coordinate to provide X'=X/Z, Y'=Y/Z.

Next, the projector 108 tests whether the polygon is forward facing or backward facing relative to the view plane. This test can be achieved by calculating the polygon normal, and measuring whether the Z component is positive or negative. The normal vector of the polygon with vertices V1, V2, V3 is calculated by:

$$N = \text{CrossProduct}\left(\frac{(V3-V2)}{|V3+V2|}\right), \left(\frac{(V1-V2)}{|V1+V2|}\right)$$

where CrossProduct (A, B) is:

$$(A_yB_z-A_zB_y, A_zB_x-A_xB_z, A_xB_y-A_yB_x)$$

If the polygon is found to be facing backwards, it is not to be rendered and the next polygon from the list 214 is read. If the polygon is found to be facing forwards, the X', Y' coordinates of the vertices are supplied to the renderer 108, which maps the vertex coordinates onto the pixel coordinates in the frame buffer, and writes pixels lying between the vertices into locations in the frame buffer 40 so as to overwrite existing pixel data (corresponding to the background, or any earlier drawn polygons).

The next polygon in the list 214 is then selected for rendering, and so on until all polygons in the list have been projected by the projector 108.

To enhance the three dimensional appearance of the object, as mentioned above, it is known to provide a shading in which polygons are accorded a brightness or level of colour intensity which is dependent upon the polygon orientation relative to a notional illumination source. Thus, polygons lying parallel and facing the illumination source will be brighter than those facing away from it. In general, some floor level of ambient light may also be allowed for, so that the illumination intensity reflected from a given polygon is the sum of a constant term and a term proportional to the cosine of the angle between the normal to the polygon and the angle of incidence of light on the polygon. The position of the notional illumination source is fixed in space at predetermined coordinates, and it is therefore possible to derive, for each polygon, the angle of incidence of light on the polygon which is conveniently taken as a normalised (unit length) vector between the polygon surface and the illumination source. The dot product of this with the polygon normal vector (derived above), added to a predetermined constant term, therefore provides the brightness with which the pixels of that polygon should be rendered. For a colour display, each polygon typically has a stored colour value comprising a red, green and a blue component stored (not shown) in the polygon table 212, and each component is multiplied by the derived brightness value to set the corresponding red, green, blue levels for each pixel of the polygon.

For many application, the object (and hence all polygons) remain still while the view plane is moved to see the object from different view points. When only the view plane is moving, it is not necessary to re-evaluate the brightness with which each polygon is displayed (unless it is desired to represent spectral reflections). However, each time the object is moved or edited it is in general necessary to re-evaluate the brightness values for each polygon. The same is, of course, true if the position of the illumination source is changed.

Many discrete rendering devices and programmes for causing a computer 100 to render are commercially available. For example, some dedicated rendering devices can act as both the projector 108 and renderer 110. Many computers (e.g. the Sun Sparc workstation) include polygon filling routines which accept vertex coordinates and a colour and fill the intervening pixels with the colour. For completeness however a brief description of a suitable rendering process will now be given.

Figure 22:
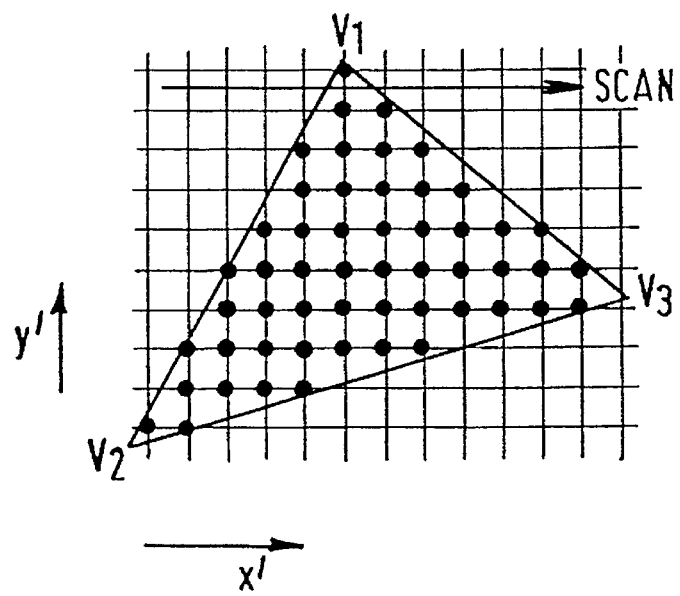
FIG. 22 shows illustratively the rendering process.

Referring to FIG. 22, as the display 50 has limited resolution the frame buffer 40 is dimensioned to contain only a corresponding number of pixels. The vertex coordinates are typically calculated at higher precision than the pixel resolution. Rendering is generally a process of scan conversion, in which the polygon is sampled at pixel points; pixels lying within the polygon boundary are set to the determined colour value whereas those lying without are untouched. Of itself, such sampling can give rise to the well known spatial aliasing phenomenon known as the "Jaggies", giving sloping lines a staircase appearance. Accordingly, preferably, one of the well known anti-aliasing rendering methods (for example the use of sub-pixel masks) is preferred, to reduce the visibility of this phenomenon. Such sub-pixel masks are employed to attenuate the pixel colour depending on the percentage of the area of the pixel within the polygon boundary.

Figure 23:
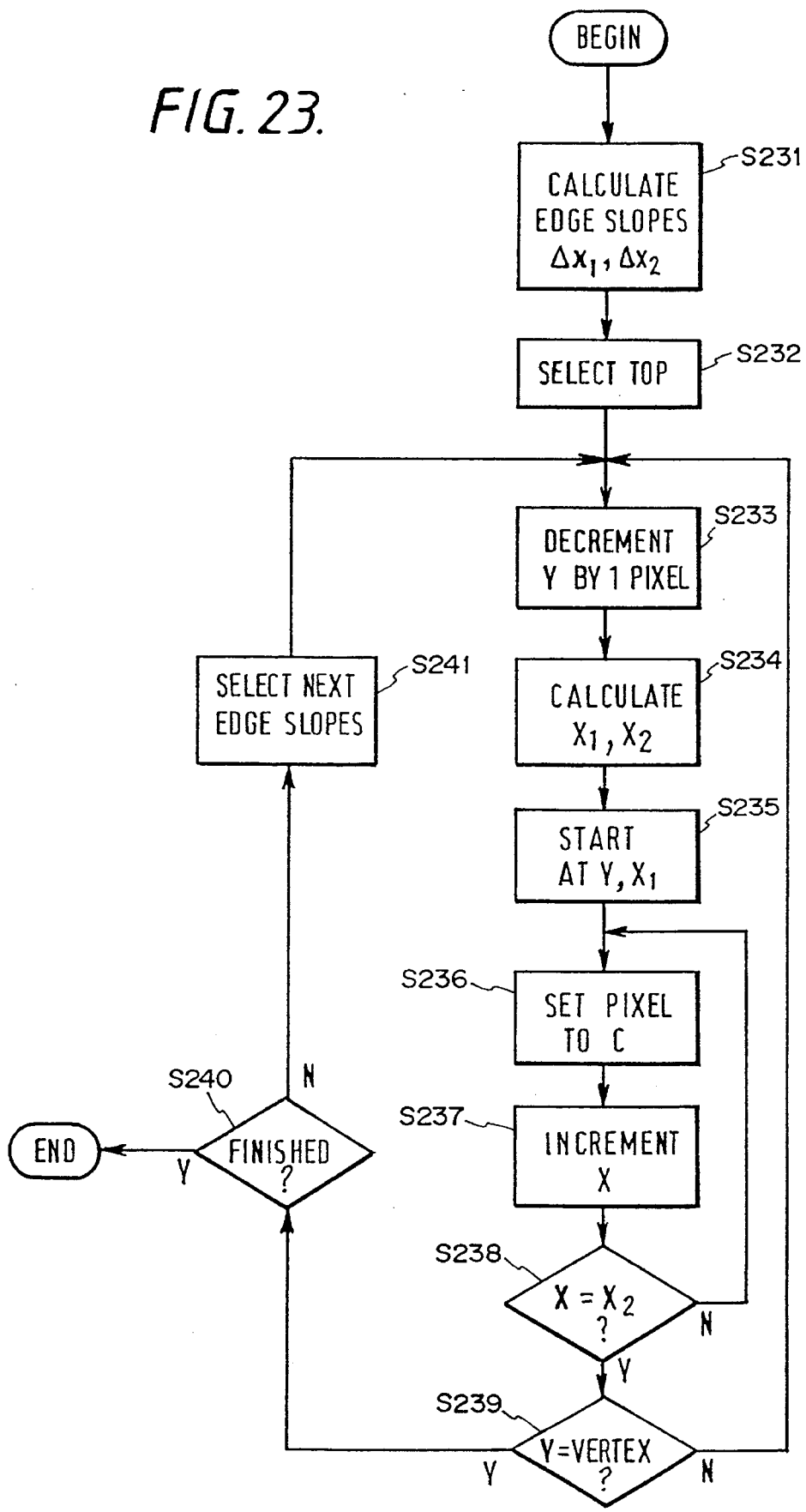
FIG. 23 is a flow diagram illustrating one suitable rendering method.

Referring to FIG. 23, one method of scan conversion is as follows. The topmost vertex (i.e. the vertex having the highest Y' component) is located (V1 in FIG. 22). The slopes of each of the edges of the polygon are constructed by taking the differences in X and Y coordinate for each edge (S231); in the below described scan conversion process, in fact, the inverse tangent (dx/dy) is determined by dividing the differences in x coordinates by the differences in y coordinate or neighbouring vertices. From this, an increment $\Delta X$ is derived corresponding to the change in x for a pixel unit change in Y. Starting with the topmost vertex (V1) (S232) the two descending edges therefrom mark the boundaries to be filled between. The Y coordinate of the topmost vertex is then decremented by an amount corresponding to one pixel (S233). The corresponding x coordinates of each of the two edges are derived by decrementing the x coordinate of the topmost vertex by the two increments $\Delta x1$, $\Delta x2$, rounded to the nearest pixel position (S234). Starting from the leftmost x1 (i.e. the lower x value) of the two edge coordinates thus determined, each pixel is set to the determined colour value for the polygon in turn until the other edge x2 is reached (S235–S238). At this point, the y coordinate of the topmost vertex is again decremented by a pixel height, and the corresponding x1, x2 edge coordinate are derived by further decrementing the topmost vertex x coordinate by the two incrementing $\Delta x1$, $\Delta x2$ (S239 NO). The polygon is therefore filled, line by line, in a descending raster scan between the two polygon edges. When the y coordinate reaches the value of another vertex (V3 in FIG. 22), the next edge (that between V3 and V2) is selected (S239–S241), and the scan is repeated downwardly until the lowest vertex (V2 in FIG. 22) is reached at which point the polygon is entirely filled (S240).

As many apparently widely different embodiments of the present invention can be made without departing from the spirit and scope thereof, it is to be understood that the invention is not limited to the specific embodiments thereof except as defined in the appended claims.

What is claimed is:

1. An apparatus for generating a sequence of two-dimensional images of a three-dimensional object, the two-dimensional images representing the object from respective desired viewing directions, the apparatus comprising:

a surface portion store for storing surface portion data corresponding to a plurality of surface portions of the object;

a first sorter for sorting said surface portion data to generate a first ordered list of surface portions corresponding to an order in which the portions may be overwritingly displayed to effect hidden surface removal, by (i) determining which, if any, of the surface portions cannot occlude others from any viewing direction and which can, (ii) entering those which cannot occlude any others in said first ordered list so as to be drawn first, and thereafter (iii) entering further surface portions in said first ordered list in succession, such that each of said first ordered portions is entered in the first ordered list when the surface portions which it can occlude are surface portions already entered in the first ordered list;

a second sorter for sorting surface portions which have not been entered in said first ordered list into a plurality of second ordered lists, each second ordered list being generated with reference to a respective predetermined view direction;

a list selector for selecting, for each two-dimensional image to be generated, one of said plurality of second lists in dependence upon the desired viewing direction of that image; and an image generator for generating each of said two-dimensional images representing the object by rendering each said portion from the first list and said selected second list in order of occurrence therein, in accordance with the desired viewing directions, portions which are backwards facing relative to the desired viewing direction not being rendered.

2. An apparatus according to claim 1, wherein said first sorter enters surface portions in said first ordered list by a topological sort process.

3. Apparatus according to claim 1, wherein said first sorter generates a table of relationships between the plurality of surface portions, indicating for a given surface portion which other surface portions can be occluded by the given surface portion, and reduces the number of stored relationships by identifying pairs of surface portions for which each can occlude the other.

4. An apparatus according to claim 1, wherein surface portions have a notional front face and a notional back face and said first sorter determines that a given one of said surface portions can occlude another of said surface portions if the other surface portion lies wholly behind a plane including the given surface portion, when viewed normal to the notional front face of the given surface portion.

5. An apparatus according to claim 1, wherein said second sorter generates each second list in dependence upon a degree to which each surface portion faces backwards, relative to the predetermined view direction.

6. An apparatus according to claim 1, wherein said image generator includes a frame store memory, and wherein each surface portion is rendered into said frame store memory so as to overwrite any previously rendered surface portions.

7. An apparatus according to claim 1, wherein said apparatus is a computer which comprises a processor.

8. A method for generating a sequence of two-dimensional images of a three-dimensional object, the two-dimensional images representing the object from respective desired viewing directions, the method comprising the steps of:
   (a) storing surface portion data corresponding to a plurality of surface portions of the object;
   (b) sorting the surface portion data to generate a first ordered list of surface portions corresponding to an order in which the portions may be overwritingly displayed to effect hidden surface removal, by (i) determining which, if any, of the surface portions cannot occlude others from any viewing direction and which can, (ii) entering those which cannot occlude any others in the first ordered list so as to be drawn first, and thereafter (iii) entering further surface portions in the first ordered list in succession, such that each of said further surface portions is entered in the first ordered list when the surface portions which it can occlude only surface portions already entered in the first ordered list;
   (c) sorting surface portions which have not been entered in the first ordered list into a plurality of second ordered lists, each second ordered list being generated with reference to a respective predetermined view direction;
   (d) selecting, for each two-dimensional image to be generated, one of the plurality of second lists in dependence upon the desired viewing direction of that image; and
   (e) generating each of the two-dimensional images representing the object by rendering each said portion from the first list and the selected second list in order of occurrence therein, in accordance with the desired viewing direction, portions which are backwards facing relative to the desired viewing direction not being rendered.

9. A method according to claim 8, wherein said sorting step (b) comprises a topological sort process.

10. A method according to claim 8, wherein said sorting step (b) includes generating a table of relationships between the plurality of surface portions indicating for a given surface portion which other surface portions can be occluded by the given surface portion, and reducing the number of stored relationships by identifying pairs of surface portions for which each can be occluded by the other.

11. A method according to claim 8, wherein surface portions have a notional front face and a notional back face and said sorting step (b) determines that a given one of the surface portions can occlude another of the surface portions, if the other surface portion lies wholly behind a plane including the given surface portion, when viewed normal to the notional front face of the given surface portion.

12. A method according to claim 8, wherein said sorting step (c) generates each second list in dependence upon a degree to which each surface portion faces backwards, relative to the predetermined view direction.

13. A method according to claim 8, wherein said image generating step (e) includes rendering each surface portion into a frame store memory, so as to overwrite any previously rendered surface portions.

14. A method of generating a signal conveying at least one two-dimensional image representing a three-dimensional object from a desired viewing direction, comprising the steps of:
   (a) storing surface portion data corresponding to a plurality of surface portions of the object;
   (b) sorting said surface portion data to generate a first ordered list thereof corresponding to an order in which said portions may be overwritingly displayed to effect hidden surface removal, by (i) determining which, if any, of said surface portions cannot occlude others from any viewing direction and which can, (ii) entering those which cannot occlude any others in said first ordered list so as to be drawn first, and thereafter (iii) entering further surface portions in said first ordered list in succession, such that each of said further surface portions is entered in the first ordered list when the surface portions which it can occlude only surface portions already entered in said first ordered list;
   (c) sorting surface portions which have not been entered in said first ordered list into a plurality of second ordered lists, each second ordered list being generated with reference to a respective predetermined view direction;
   (d) selecting, for each two-dimensional image to be generated, one of said plurality of second lists in dependence upon the desired viewing direction of that image; and
   (e) generating an image signal corresponding to each of said two-dimensional images representing said object by rendering each said portion from the first list and the selected second list in order of occurrence therein, in accordance with the desired viewing direction, portions which are backwards facing relative to the desired viewing direction not being rendered.

15. A method of generating data defining at least one two-dimensional image representing a three-dimensional object from a desired viewing direction, comprising the steps of:
   (a) storing surface portion data corresponding to a plurality of surface portions of the object;
   (b) sorting said surface portion data to generate a first ordered list thereof corresponding to an order in which said portions may be overwritingly displayed to effect hidden surface removal, by (i) determining which, if any, of said surface portions cannot occlude others from any viewing direction and which can, (ii) entering those which cannot occlude any others in said first ordered list so as to be drawn first, and thereafter (iii) entering further surface portions in said first ordered list in succession, such that each of said further surface portions is entered in the first ordered list when surface portions which it can occlude only surface portions already entered in said first ordered list;
   (c) sorting surface portions which have not been entered in said first ordered list into a plurality of second ordered lists, each second ordered list being generated with reference to a respective predetermined view direction;
   (d) selecting, for each two-dimensional image to be generated, one of said plurality of second lists in dependence upon the desired viewing direction of that image;
   (e) generating image data corresponding to each of said two-dimensional images representing the object by rendering each said portion from the first list and the selected second list in order of occurrence therein, in accordance with the desired viewing direction, portions which are backwards facing relative to the desired viewing direction not being rendered; and (f) storing said image data in a storage device.

16. A method of generating a rendering order list for subsequent use in rendering a two-dimensional image representing a three-dimensional object from a desired viewing direction, comprising the steps of:

(a) storing surface portion data corresponding to a plurality of surface portions of the object;

(b) sorting said surface portion data to generate a first ordered list thereof corresponding to an order in which said portions may be overwritingly displayed to effect hidden surface removal, by (i) determining which, if any, of said surface portions cannot, assuming that rendering will be performed with back face culling, occlude others from any viewing direction and which can, (ii) entering those which cannot occlude any others in said first ordered list so as to be drawn first, and thereafter (iii) entering further surface portions in said first ordered list in succession, such that each of said further surface portions is entered in the first ordered list when the surface portions which it can occlude are surface portions already entered in said first ordered list;

(c) sorting surface portions which have not been entered in said first ordered list into a plurality of second ordered lists, each second ordered list being generated with reference to a respective predetermined view direction; and (d) selecting, for the two-dimensional image to be generated, one of said plurality of second lists in dependence upon the desired viewing direction of that image.

17. A method according to claim 16, further comprising the step of generating a signal defining the first list and the selected second list.

18. A data storage device wherein there is embodied a program for causing an image processing apparatus to perform a method according to any of claims 8, 9 to 15, 16 and 17.

* * * * *

UNITED STATES PATENT AND TRADEMARK OFFICE
CERTIFICATE OF CORRECTION

PATENT NO. : 5,579,454
DATED : November 26, 1996
INVENTOR(S) : ADAM BILLYARD ET AL.

Page 1 of 4

It is certified that error appears in the above-identified patent and that said Letters Patent is hereby corrected as shown below:

COLUMN 1

Line 13, "Arts" should read --Art--.

COLUMN 3

Line 20, "(ie" should read --(i.e.,--.

COLUMN 4

Line 2, "objection" should read --object--.
Line 6, "so" should read --so- --.
Line 42, "schematically" should read --schematically an--.

COLUMN 5

Line 65, "units" should read --unit--.

COLUMN 6

Line 65, "(ie" should read --(i.e.,--.

COLUMN 8

Line 24, "with" should read --which--.
Line 44, "therefore" should read --therefore,--.
Line 46, "their vertex" should read --the vertex--.
Line 66, "necessary" should read --necessarily--.

UNITED STATES PATENT AND TRADEMARK OFFICE
CERTIFICATE OF CORRECTION

PATENT NO. : 5,579,454
DATED : November 26, 1996
INVENTOR(S) : ADAM BILLYARD ET AL.

It is certified that error appears in the above-identified patent and that said Letters Patent is hereby corrected as shown below:

COLUMN 9

Line 4, "store 212" should read --table 212--.

COLUMN 10

Line 20, "shown in" should read --shown. In--.
Line 37, "front" should read --front of--.

COLUMN 11

Line 4, "front" should read --front of--.

COLUMN 13

Line 10, "an" should read --and--.
Line 15, "non occluding" should read --non-occluding--.

COLUMN 14

Line 22, "much" should read --must--.
Line 35, "an" should read --a--.
Line 36, "front" should read --front of--.
Line 51, "FIG. 13," should read --FIG. 13--.

UNITED STATES PATENT AND TRADEMARK OFFICE
CERTIFICATE OF CORRECTION

PATENT NO. : 5,579,454
DATED : November 26, 1996
INVENTOR(S) : ADAM BILLYARD ET AL.

It is certified that error appears in the above-identified patent and that said Letters Patent is hereby corrected as shown below:

COLUMN 15

Line 27, "correspond" should read --corresponds--.
Line 35, "read," should read --reads,--.
Line 41, "coordinates coordinates" should read --coordinates--.
Line 49, "h" should read --k--.

COLUMN 16

Line 17, "appears" should read --appear--.
Line 37, "renderer 108," should read --renderer 110,--.

COLUMN 17

Line 6, "application," should read --applications,--.

COLUMN 18

Line 54, "Apparatus" should read --An apparatus--.

COLUMN 19

Line 28, "only" should read --are--.

UNITED STATES PATENT AND TRADEMARK OFFICE
CERTIFICATE OF CORRECTION

PATENT NO. : 5,579,454
DATED : November 26, 1996
INVENTOR(S) : ADAM BILLYARD ET AL.

It is certified that error appears in the above-identified patent and that said Letters Patent is hereby corrected as shown below:

<u>COLUMN 20</u>

Line 19, "only" should read --are--.
Line 54, "only" should read --are--.

Signed and Sealed this

Fourteenth Day of April, 1998

Attest:

BRUCE LEHMAN

Attesting Officer

Commissioner of Patents and Trademarks